US012732815B1

(12) United States Patent
Heine et al.

(10) Patent No.: US 12,732,815 B1
(45) Date of Patent: Sep. 8, 2026

(54) COMPUTER-IMPLEMENTED SYSTEM AND METHOD FOR AUTOMATICALLY MANAGING DIGITAL RECORDS AND CREDENTIAL-VERIFIED TRUST CERTIFICATES OF RADIO-CONNECTED ELECTRONIC DEVICES

(71) Applicant: PrologMobile, Inc., Louisville, CO (US)

(72) Inventors: Seth David Heine, Louisville, CO (US); James Luke Heine, Rome (IT); Jon Richard Newman, St. Augustine, FL (US); James Michael Newman, Wheaton, IL (US); Zachary Vorwaller, Colorado Springs, CO (US)

(73) Assignee: PrologMobile, Inc.

( * ) Notice: Subject to any disclaimer, the term of this patent is extended or adjusted under 35 U.S.C. 154(b) by 0 days.

(21) Appl. No.: 19/633,024

(22) Filed: Mar. 30, 2026

Related U.S. Application Data

(60) Provisional application No. 63/870,358, filed on Aug. 26, 2025.

(51) Int. Cl.
*H04W 12/069* (2021.01)
*H04W 12/126* (2021.01)
*H04W 12/60* (2021.01)

(52) U.S. Cl.
CPC ....... *H04W 12/069* (2021.01); *H04W 12/126* (2021.01); *H04W 12/66* (2021.01)

(58) Field of Classification Search
None
See application file for complete search history.

(56) References Cited

U.S. PATENT DOCUMENTS 8,443,355 B2 5/2013 Wiese et al.
2013/0332257 A1* 12/2013 Scheinost ............. G06Q 30/02 705/14.36

(Continued)

OTHER PUBLICATIONS

Phone Check et al. What is Mobile Device Certification and Why Is It important?—(Year: 2022).*

(Continued)

*Primary Examiner* — Younes Naji
(74) *Attorney, Agent, or Firm* — Jason C. Cameron

(57) ABSTRACT

A computer-implemented system and method for managing digital records and credential-verified trust certificates of devices, are disclosed. The system identifies devices through unique identifiers. The system determines profile of devices, from first, second, third reports. The system generates credential-verified trust certificates by integrating data associated with digital records and profiles of devices. The system determines first reports applicable to associated profile regarding ability of devices, second reports applicable to profile of devices regarding device's condition, status, and capabilities, and third reports applicable to certified end-of-life processing of devices. The system determines owner-imposed anti-theft locks and encumbrances and network-imposed device locks and encumbrances, which reduce or restrict device operability or prevent unauthorized transaction and device re-use. The system determines compatibility scores with intended operational locality. The system accesses, analyzes, and associates reports to devices, indicating ability of devices to be identified, differentiated, transacted, and operated as intended by new user.

17 Claims, 13 Drawing Sheets

(56) References Cited

U.S. PATENT DOCUMENTS

| | | | | |
|---|---|---|---|---|
| 2015/0024720 | A1* | 1/2015 | Efrati | H04W 12/02 455/414.1 |
| 2015/0038130 | A1* | 2/2015 | Mao | G06F 11/3692 455/418 |
| 2022/0335116 | A1 | 10/2022 | Brazao et al. | |

OTHER PUBLICATIONS

NSYS Group—How used device certification increases the resale value of phones? (Year: 2021).*

Phone Check et al. "Phonecheck brings AI and Automation to used Device Certification process increasing Transparency and confidence when buying Renewed Electronics" (Year: 2022).*

* cited by examiner

User Access / Input 602
Manual Input / File Upload / API
Device Certificate Refresh Settings User Management Module 604

Device Information Repository (Synthesized) 606

Device Report Repository 616

Device Logic Engine 608

Determines query sequence
Determines analytics
Determines optimization

External Data Engine 618

Third Party Query / Reports

Analytics Engine 610

Reconstitute Device Attributes
Analyze Device Characteristics
Generate Device Profile
Generate Device Compatibility Scoring Business Process Solutions 620

Inventory and Data Catalog Management

Trust Certificate Management
- Data Import
- iPSR Export

Permissions Management System

Support Systems

Third Party Data Interrogation System Coordination

Queue Systems
Billing / Payment Systems

Notification Service 612
Messaging Communications

Device Compatibility Service 614

FIG. 6

DETERMINE, FOR THE RADIO-CONNECTED ELECTRONIC DEVICES, SECOND REPORTS APPLICABLE TO THE ASSOCIATED PROFILE OF THE RADIO-CONNECTED ELECTRONIC DEVICE REGARDING REPORTS ABOUT FUNCTIONAL, TECHNICAL, OPERATIONAL, PHYSICAL, AND COSMETIC STATES, CONDITION, STATUS, AND CAPABILITIES OF THE RADIO-CONNECTED ELECTRONIC DEVICE IN TERMS OF THE ABILITY TO SAFELY AND EFFECTIVELY USE RADIO-CONNECTED ELECTRONIC DEVICE AS INTENDED BY A NEW USER

810

DETERMINE THE THIRD REPORTS APPLICABLE TO CERTIFIED END-OF-LIFE PROCESSING, COMPRISING SECURE ERASURE, PHYSICAL DESTRUCTION, AND MATERIAL RECOVERY OF THE RADIO-CONNECTED ELECTRONIC DEVICES

812

DETERMINE OWNER-IMPOSED ANTI-THEFT LOCKS AND ENCUMBRANCES TO PREVENT UNAUTHORIZED TRANSACTION AND RE-USE OF THE RADIO-CONNECTED ELECTRONIC DEVICE BY ANOTHER END-USER AS THE FIRST REPORTS BASED ON AT LEAST ONE OF: A DEVICE MANUFACTURER, AN OWNER, AND ASSET MANAGEMENT USER OF THE RADIO-CONNECTED ELECTRONIC DEVICES, IMPACTING THE ABILITY TO BE ACQUIRED BY AND SUBSEQUENTLY UTILIZED BY A NEW OWNER WITHOUT A REDUCTION IN OPERATIONAL CAPABILITIES

814

DETERMINE NETWORK-IMPOSED DEVICE LOCKS AND ENCUMBRANCES INDICATING THAT THE RADIO-CONNECTED ELECTRONIC DEVICE IS LOCKED, DUE TO AT LEAST ONE OF: CLAIM OF CONTRACT DISPUTES, PURCHASE OBLIGATIONS, UNPAID SERVICE FEES, AND UNSATISFIED OBLIGATION IN WHICH THE PRIOR OWNER'S MOBILE NETWORK HAS LOCKED THE RADIO-CONNECTED ELECTRONIC DEVICE TO OR FROM A NETWORK

816

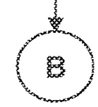

FIG. 8B

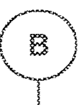

DETERMINE COMPATIBILITY SCORES OF THE RADIO-CONNECTED ELECTRONIC DEVICES WITH AN INTENDED OPERATIONAL LOCALITY THROUGH USE OF A DEVICE COMPATIBILITY SERVICE FOR AT LEAST ONE OF: A COUNTRY AND A MOBILE NETWORK OPERATOR IN A COUNTRY — 818

ACCESS, ANALYZE AND ASSOCIATE THE FIRST REPORTS, THE SECOND REPORTS, AND THE THIRD REPORTS TO THE RADIO-CONNECTED ELECTRONIC DEVICES, INDICATING THE ABILITY OF THE RADIO-CONNECTED ELECTRONIC DEVICES TO BE IDENTIFIED, DIFFERENTIATED, TRANSACTED, AND OPERATED AS INTENDED BY THE NEW USER — 820

DETERMINE CERTIFICATIONS AND CREDENTIALS OF THE PLURALITY OF SOURCE PROVENANCE CERTIFIED DATA SOURCES AND THE VERIFIED IDENTITY DATA SOURCES, PROVIDING THE FIRST REPORTS APPLICABLE TO DEVICE IDENTIFICATION AND ENTITLEMENT, THE SECOND REPORTS APPLICABLE TO THE FUNCTIONAL, TECHNICAL, AND COSMETIC STATUS AND CONDITION, AND THE THIRD REPORTS APPLICABLE TO THE CERTIFIED DEVICE DESTRUCTION THROUGH A CERTIFIED DEVICE DESTRUCTION FACILITY, WITH REGARD TO THE RADIO-CONNECTED ELECTRONIC DEVICES — 822

PROVIDE AND TRANSMIT THE DETERMINED FIRST REPORTS, SECOND REPORTS, AND THIRD REPORTS OF THE RADIO-CONNECTED ELECTRONIC DEVICES IN A TRUST CERTIFICATE FORMAT TO REQUESTING USERS THROUGH USER INTERFACE METHODS IMPLEMENTED BY COMMUNICATION DEVICES OF THE REQUESTING USERS AND PROCESS AND SUPPORT USER INTERACTION REGARDING INCREMENTAL OR REFRESHED REPORTS — 824

FIG. 8C

COMPUTER-IMPLEMENTED SYSTEM AND METHOD FOR AUTOMATICALLY MANAGING DIGITAL RECORDS AND CREDENTIAL-VERIFIED TRUST CERTIFICATES OF RADIO-CONNECTED ELECTRONIC DEVICES

CROSS-REFERENCE TO RELATED APPLICATIONS

This application claims priority from provisional U.S. Application No. 63/870,358 titled SYSTEM AND METHOD FOR GENERATING VERIFIABLE CREDENTIAL-BASED TRUST CERTIFICATES FOR RADIO-CONNECTED ELECTRONIC DEVICES, filed on Aug. 26, 2025, which is hereby incorporated by reference in its entirety.

TECHNICAL FIELD

Embodiments of the present disclosure relate to electronic device lifecycle management and digital identity systems, and more particularly, relate to a computer-implemented system and method for automatically managing one or more digital records about, and generating and managing verifiable, credential-based trust certificates for the one or more radio-connected electronic devices.

BACKGROUND

One or more radio-connected electronic devices, utilizing radio spectrum as described and specified by standards bodies including the 3rd Generation Partnership Project (3GPP), European Telecommunications Standards Institute (ETSI), International Telecommunication Union (ITU), Global System for Mobile Communications Association (GSMA), and others, are ubiquitous globally. Most individuals possess at least one such radio-connected electronic device, with many owning several. Technological innovation and improved interoperability across device categories contribute to shorter product replacement cycles, resulting in a growing population of non-new radio-connected electronic devices. The one or more radio-connected electronic devices present material sourcing, environmental, transportation, and production cost challenges, particularly within the context of a second-life device market.

When the one or more radio-connected electronic devices leave the hands of an original consumer, the one or more radio-connected electronic devices become circular devices and enter a series of circularity lifecycle stages to return to a new customer through formal and informal marketplaces. This device flow, also known as a circular economy, introduces business, legal, and environmental challenges, including compliance with energy, water, and material usage disclosures, as well as ensuring technical usability and performance of the circular devices.

The one or more radio-connected electronic devices in the circular economy pass through standardized stages: identification, diagnostics and erasure, repair and parts replacement, logistics, repackaging, and resale and recycling and/or materials reclamation. At each point, reliable information about the radio-connected electronic device is essential for profitability, sustainability, and compliance.

As the second-life device market expands, new demands arise regarding the physical, technical, and operational status and condition of reused radio-connected electronic devices and the verification of non-accessory components such as batteries, screens, cameras, and buttons and the like, whether Original Equipment Manufacturer (OEM) or third party. Such information about a device, via the unique identifier(s), is required by telecom industry participants, regulatory bodies, and other circular economy participants with regard to the risk of counterfeit devices, spoofed IMEIs, and other unauthorized devices being utilized on networks. Additionally, the availability of supplemental insurance products, outside of original manufacturer warranties, is increasingly critical to supporting the circular economy. Last but not least, a device's network compatibility is, at it's most fundamental basis, a safety concern. Both the device user, and countries' governments and networks also need to be able to use these devices to send and receive emergency communication. All other uses (telephony, internet, etc.) are subordinate to such basic safety use requirements.

There is a significant need for authoritative, verifiable data at each stage of the circular lifecycle, yet data is often retained only by disparate device owners at each stage or process. Such data must support transparency for all stakeholders, manufacturers, refurbishers, retailers, network carriers, regulators, and end-users. With non-new radio-connected electronic devices entering the resale stage, the dislocation of lifecycle reports from the point of sale, along with incomplete or non-authoritative information regarding the one or more radio-connected electronic devices, has resulted in the sale of the one or more radio-connected electronic devices with limited functionality, operability, and capabilities. This, in turn, contributes to consumer mistrust in circular devices and the associated circular economy marketplaces.

Consumer electronics production requires substantial physical resources and generates environmental impact through rare earth mining, battery material processing, and sub-component integration. The one or more radio-connected devices involve rare and hazardous materials that are costly and environmentally taxing to obtain. In this context, Digital Product Passports (DPPs) have been introduced to promote transparency regarding product sustainability, materials provenance, and environmental impact, alongside additional ecodesign and energy labelling requirements to improve transparency about devices offered for transaction.

Driven by the European Union's Circular Economy Action Plan (CEAP) and the Ecodesign for Sustainable Products Regulation (ESPR), the DPPs are mandated for sectors such as batteries and broader consumer electronics. The DPPs must be based on open standards, use interoperable data formats, be digitally accessible/machine-readable, structured, searchable, and include comprehensive product information, covering origin, composition, environmental footprint, and guidance for end-of-life handling.

Examples of DPP presentation mechanisms include data carriers such as Quick Response (QR) codes, Radio Frequency Identification (RFID), Near Field Communication (NFC), and machine-readable formats compatible with consumer devices. These records rely on global device identifiers, frameworks and standards (such as the GSMA, GS1, ETSI, 3GPP, ITU, International Organization for Standardization (ISO), and International Electrotechnical Commission (IEC), and United Nations Transparency Protocol (UNTP)) for standards-based device identification and reference, and aim to bring transparency and traceability to the materials and $CO_2$ emissions involved in the product lifecycle.

Globally, regulatory and compliance demands are increasing, including Scope 1 (direct emissions), Scope 2 (purchased energy indirect emissions), and Scope 3 (value chain indirect emissions) emissions reporting under the Greenhouse Gas (GHG) Protocol. Telecommunications networks and manufacturers must increasingly report on sustainability efforts, device authenticity, and material sourcing across their operations including devices sold to customers. DPPs and digital twins have emerged as key mechanisms to fulfill legal, environmental, and commercial needs.

The DPPs may be validated via one of: centralized trust mechanisms and decentralized models (blockchain), and primarily capture data at the time of manufacture, source provenance and resource utilization in manufacturing, usage guidance, and end-of-life disposal instructions. However, DPPs do not have a standardized means of reflecting dynamic changes in the circular devices, such as repairs, encumbrances, compatibility updates, and device misuse (e.g., theft).

The one or more radio-connected electronic devices, increasingly sealed for dust and water ingress protection with non-user-removable batteries and parts, are opaque to visual inspection beyond external cosmetic condition. The condition of the one or more radio-connected electronic devices, authenticity of replacement parts, presence of hardware faults, software status, security locks, and network compatibility etc., cannot be assessed by sight alone. Additionally, many radio-connected electronic devices undergo component replacement, software updates, and are involved in ownership disputes post-manufacture.

Further, the resale of stolen or counterfeit radio-connected electronic devices, particularly across international borders, exposes consumers, telecom networks and governmental entities to risks including fraud and loss. The circular device market requires dynamic, updatable, and verifiable digital records that may travel with the radio-connected electronic device throughout the lifecycle. Thus, while the DPPs are critical, there is need to systematically aggregate secondary reports and records for the needs of the circular economy.

The DPPs and IMEI-based assessments currently provide limited transparency as static snapshots of a radio-connected electronic device's status at origin, lacking actionable insights regarding compatibility, network locks, and dynamic risk state changes that are introduced after the initial purchase, power-on, and use by the initial owner. Further, a current limitation of existing art and practices is that such reports and assessments are not aggregated, consolidated, or utilized in the economic transaction of device circularity beyond a requesting party. Further, regarding devices without a DPP, including devices already in use, the current disclosure represents a proxy DPP in which device identification, attributes, and other known reports from authoritative sources about the device and its attributes may be presented to the requesting party.

Existing systems do not incorporate circularity/resale-related data points/attributes that utilize consumer intent (e.g., device compatibility in a target country or network), which are also not contained within the scope of the DPPs and existing systems. In the current market, shortcomings lead to failed device activations, consumer dissatisfaction, device claims, and returns in accordance with consumer protections that are legally mandated in a growing number of countries globally. Furthermore, fulfillment to the aggrieved consumer involves replacement with another radio-connected electronic device that may be equally unsatisfactory, thereby perpetuating the cycle of mistrust and inefficiency in circular device transactions.

Therefore, there exists a need for an improved computer-implemented system and method to overcome the limitations of the DPPs by enabling the creation, update, and verification of dynamic, interactive, and trustworthy digital records associated with the one or more radio-connected electronic devices and associate such records with a specific discrete radio-connected electronic device. Such a system must support real-time integration of post-manufacturing events, including diagnostics, repairs, encumbrances, ownership changes, and network compatibility, while maintaining regulatory compliance and enhancing stakeholder confidence across the circular economy.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented system for automatically managing one or more digital records and one or more credential-verified trust certificates of one or more radio-connected electronic devices, is disclosed. The computer-implemented system comprises one or more hardware processors and a memory unit. The memory is operatively coupled to the one or more hardware processors. The memory comprises a plurality of subsystems in form of machine-readable instructions executable by the one or more hardware processors.

The plurality of subsystems comprises a device identifying subsystem configured to identify the one or more radio-connected electronic devices through one or more unique identifiers available for the one or more radio-connected electronic devices. The one or more unique identifiers are standards-based device identifiers comprising at least one of: International Mobile Equipment Identity (IMEI), Embedded Identity Document (EID), and serial number, and wherein the one or more unique identifiers indicate device data attributes comprising at least one of: visible attributes comprising make and model information, non-visible attributes, and non-disclosed attributes comprising modem radio configuration and capabilities. The plurality of subsystems further comprises a profile determining subsystem configured to determine a profile of the one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices. The plurality of subsystems further comprises a trust certificate generating subsystem configured to generate the one or more credential-verified trust certificates by integrating data associated with one or more digital records and profiles corresponding to each identified radio-connected electronic device in a data model framework (such as the UNTP) to support transparency and traceability of data reports about a device.

The plurality of subsystems further comprises a report determining subsystem configured to at least one of: (a) determine, for the one or more radio-connected electronic devices, the one or more first reports applicable to the associated profile of a radio-connected electronic device regarding the ability of the radio-connected electronic device to be identified, differentiated from another radio-connected electronic device, transacted, associated with a new user account, authenticated by a manufacturer/OEM for at least one of: DPP, warranty and registration, and connected to a cellular network as intended; (b) determine, for the one or more radio-connected electronic devices, one or more second reports applicable to the associated profile of the radio-connected electronic device regarding one or more reports about functional, technical, operational, physical, and cosmetic states, condition, status, and capabilities of the radio-connected electronic device in terms of the ability to use the radio-connected electronic device as intended by a new user; and (c) determine one or more third reports applicable to certified end-of-life processing, comprising secure erasure, physical destruction, and material recovery of the one or more radio-connected electronic devices.

The plurality of subsystems further comprises an encumbrance determining subsystem configured to determine owner-imposed anti-theft locks and encumbrances to prevent unauthorized transaction and re-use of the radio-connected electronic device by another end-user as the one or more first reports based on at least one of: a device manufacturer, an owner, and asset management user of the one or more radio-connected electronic devices, impacting the ability to be acquired by and subsequently utilized by a new owner without a reduction in operational capabilities. The encumbrance determining subsystem is further configured to determine network-imposed device locks and encumbrances indicating that the radio-connected electronic device is locked, due to at least one of: claim of contract disputes, purchase obligations, unpaid service fees, and unsatisfied obligation in which the prior owner's mobile network has locked the radio-connected electronic device to or from a network associated with the radio-connected electronic device.

The plurality of subsystems further comprises a score determining subsystem configured to determine one or more compatibility scores of the one or more radio-connected electronic devices with an intended operational locality through use of a device compatibility service for at least one of: a country and a mobile network operator in a country. The one or more compatibility scores are determined through input from at least one of: a user profile, and a recognized user for compatibility scoring of the one or more radio-connected electronic devices for at least one of: a country and a network not already contained in a compatibility scoring report for the radio-connected electronic device. In an embodiment, the one or more compatibility scores are determined from at least one of; the user profile, seller profile, and marketplace profile in which a country is associated for initial compatibility assessment.

The plurality of subsystems further comprises a status report determining subsystem configured to access, analyze and associate the one or more first reports, the one or more second reports, and the one or more third reports to the one or more radio-connected electronic devices, indicating the ability of the one or more radio-connected electronic devices to be identified, differentiated, transacted, and operated as intended by the new user. The plurality of subsystems further comprises the report determining subsystem configured to determine one or more certifications and credentials of the plurality of source provenance certified data sources and the verified identity data sources, such as those providing first-reports applicable to device identification and entitlement, second-reports applicable to the functional, technical, and cosmetic status and condition, and third-reports applicable to the certified device destruction through a certified device destruction facility, with regard to the one or more radio-connected electronic devices. The plurality of subsystems further comprises an output subsystem configured to provide and transmit the determined one or more first reports-, one or more second reports, and one or more third-reports of the one or more radio-connected electronic devices in a trust certificate format to one or more requesting users through one or more user interface methods (such as an app, or browser) implemented by one or more communication devices of the one or more requesting user In an aspect, a computer-implemented method for automatically managing one or more digital records and one or more credential-verified trust certificates of one or more radio-connected electronic devices, is disclosed. The computer-implemented method comprises identifying the one or more radio-connected electronic devices through one or more unique identifiers available for the one or more radio-connected electronic devices. The one or more unique identifiers are standards-based device identifiers comprising at least one of: International Mobile Equipment Identity (IMEI), Embedded Identity Document (EID), and serial number, and wherein the one or more unique identifiers indicate device data attributes comprising at least one of: visible attributes comprising make and model information, non-visible attributes, and non-disclosed attributes comprising modem radio configuration and capabilities.

The computer-implemented method further comprises determining a profile of the one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices. The computer-implemented method further comprises generating one or more credential-verified trust certificates by integrating data associated with the one or more digital records and profiles corresponding to each identified radio-connected electronic device using data models and the data model frameworks that support transparency and traceability of data reports about each radio-connected electronic device.

The computer-implemented method further comprises determining, for the one or more radio-connected electronic devices, one or more first reports applicable to the associated profile of a radio-connected electronic device regarding the ability of the radio-connected electronic device to be identified, differentiated from another radio-connected electronic device, transacted, associated with a new user account, authenticated by the manufacturer/OEM for at least one of: DPP, warranty and registration, and connected to a cellular network as intended. The computer-implemented method further comprises determining, for the one or more radio-connected electronic devices, one or more second reports applicable to the associated profile of the radio-connected electronic device regarding one or more reports about functional, technical, operational, physical, and cosmetic states, condition, status, and capabilities of the radio-connected electronic device in terms of the ability to use the radio-connected electronic device as intended by a new user.

The computer-implemented method further comprises determining, for the one or more radio-connected electronic devices, the one or more third reports applicable to certified end-of-life processing, comprising secure erasure, physical destruction, and material recovery of the one or more radio-connected electronic devices. The computer-implemented method further comprises determining owner-imposed anti-theft encumbrances and locks to prevent unauthorized transaction and re-use of the radio-connected electronic device by another end-user as the one or more first reports based on at least one of: a device manufacturer, an owner, and asset management user of the one or more radio-connected electronic devices, impacting the ability to be acquired by and subsequently utilized by a new owner without a reduction in operational capabilities. The computer-implemented method further comprises determining network-imposed device locks and encumbrances indicating that the radio-connected electronic device is locked due to at least one of: claim of contract disputes, purchase obligations, unpaid service fees, and unsatisfied obligation in which the prior owner's mobile network has locked the radio-connected electronic device to or from a network associated with the radio-connected electronic device.

The computer-implemented method further comprises determining one or more compatibility scores of the one or more radio-connected electronic devices with an intended operational locality through use of a device compatibility service for at least one of: minimum of a country and a mobile network operator in a country. The one or more compatibility scores are determined through input from at least one of a user profile and a recognized user for compatibility scoring of the one or more radio-connected electronic devices for at least one of: a country and a network not already contained in a compatibility scoring report for the radio-connected electronic device.

The computer-implemented method further comprises accessing, analyzing, and associating the one or more first reports, the one or more second reports, and the one or more third reports to the one or more radio-connected electronic devices, indicating the ability of the one or more radio-connected electronic devices to be identified, differentiated, transacted, and operated as intended by the new user. The computer-implemented method further comprises determining one or more certifications and credentials of the plurality of source provenance certified data sources and the verified identity data sources providing the one or more first reports applicable to device identification and entitlement, the one or more second reports applicable to the functional, technical, and cosmetic status and condition, and the one or more third reports applicable to certified device destruction through a certified device destruction facility, with regard to the one or more radio-connected electronic devices. The computer-implemented method further comprises providing and transmitting the determined one or more first reports, one or more second reports, and one or more third reports of the one or more radio-connected electronic devices in a trust certificate format, to one or more requesting users through one or more user interface methods implemented by one or more communication devices of the one or more requesting users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 6 illustrates an exemplary block diagram depicting the computer-implemented system for automatically managing the one or more digital records and the one or more credential-verified trust certificates of the one or more radio-connected electronic devices, in accordance with an embodiment of the present disclosure;

FIG. 8A-8C is a flow diagram illustrating a computer-implemented method for automatically managing the one or more digital records the one or more credential-verified trust certificates of the one or more radio-connected electronic devices, in accordance with an embodiment of the present disclosure.

Figure 1A:
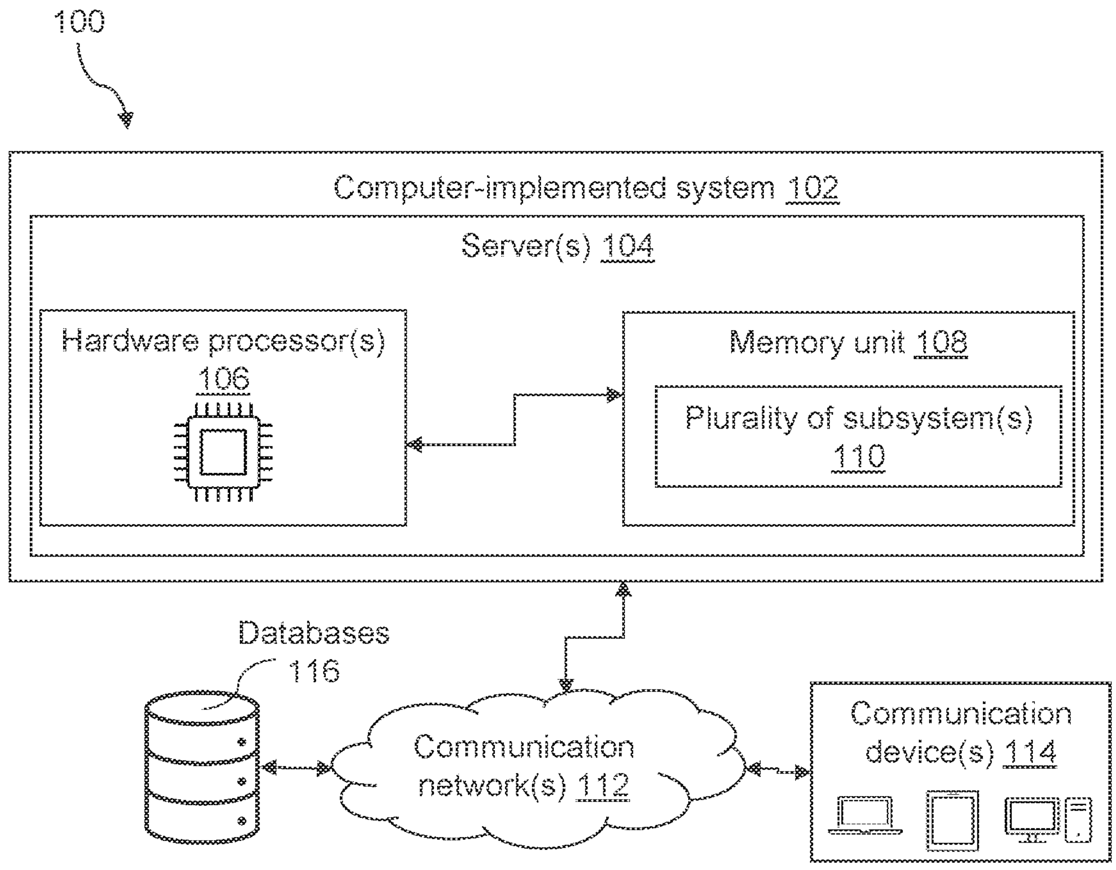
FIG. 1A illustrates an exemplary block diagram representation of a network architecture depicting a computer-implemented system for automatically managing one or more digital records and one or more credential-verified trust certificates of the one or more radio-connected electronic devices, in accordance with an embodiment of the present disclosure.

Further, those skilled in the art will appreciate that elements in the figures are illustrated for simplicity and may not have necessarily been drawn to scale. Furthermore, in terms of the construction of the systems and methods of the present disclosure, one or more components of the disclosure may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1A through FIG. 8C, where similar reference characters denote corresponding features consistently throughout the figures, there are shown preferred embodiments and these embodiments are described in the context of the following exemplary system and/or method.

Figure 1B:
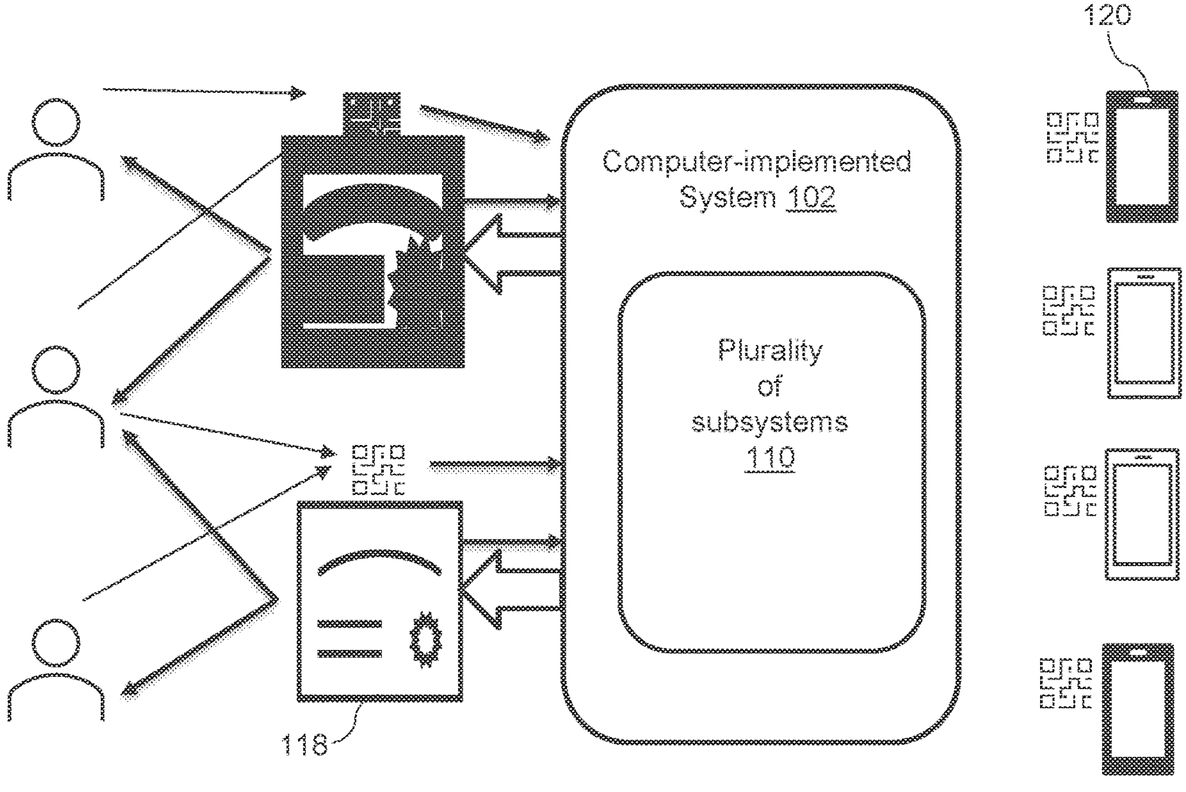
FIG. 1B illustrates an exemplary diagram of the computer-implemented system for creating, managing, and reproducing the one or more credential-verified trust certificates including the one or more digital reports about the one or more radio-connected electronic devices, in accordance with an embodiment of the present disclosure.
Figure 2A:
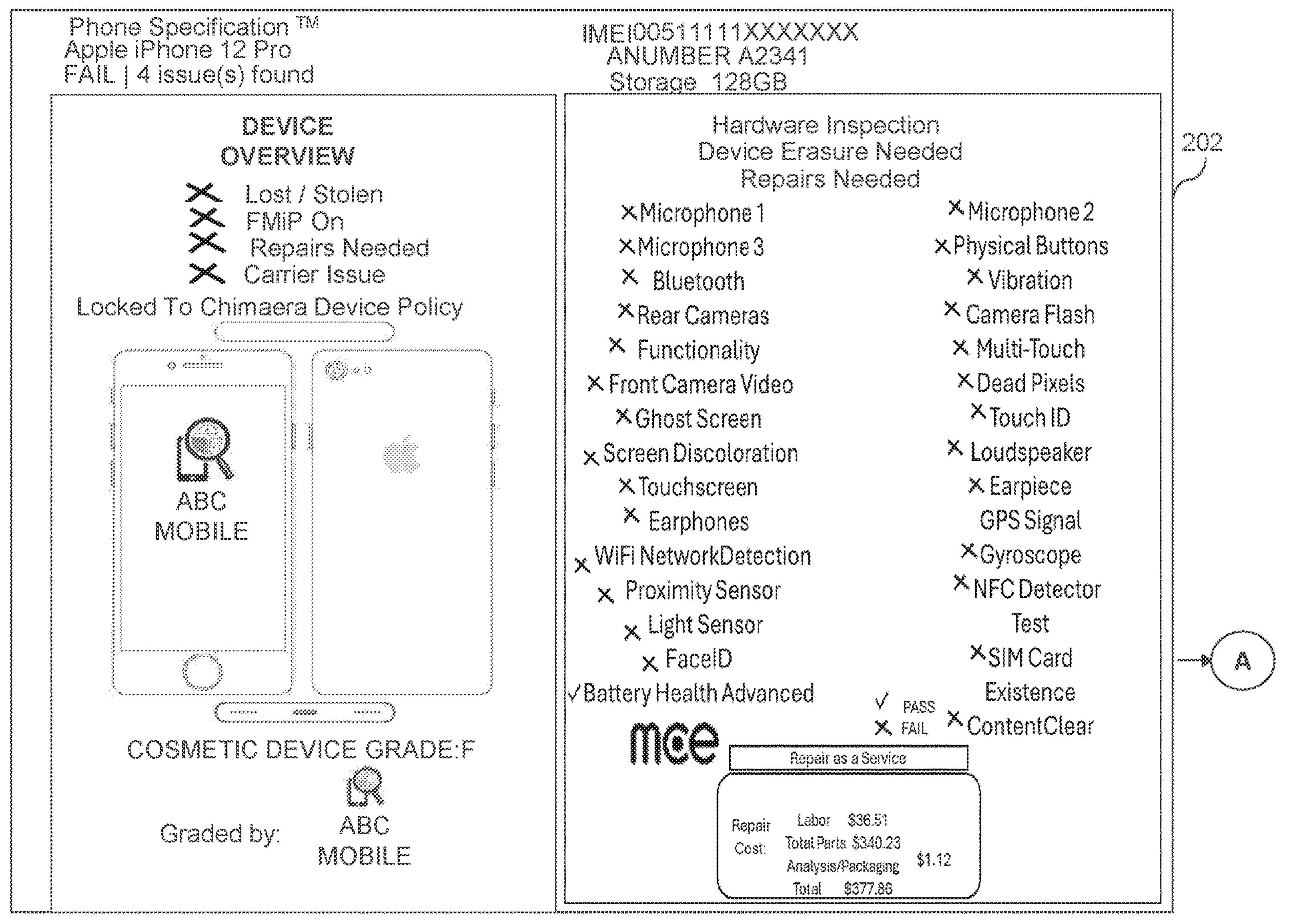
FIG. 2A-2B illustrates exemplary visual representations depicting the one or more credential-verified trust certificates that shows interactive product status record (IPSR) of the device, in accordance with an embodiment of the present disclosure.
Figure 2B:
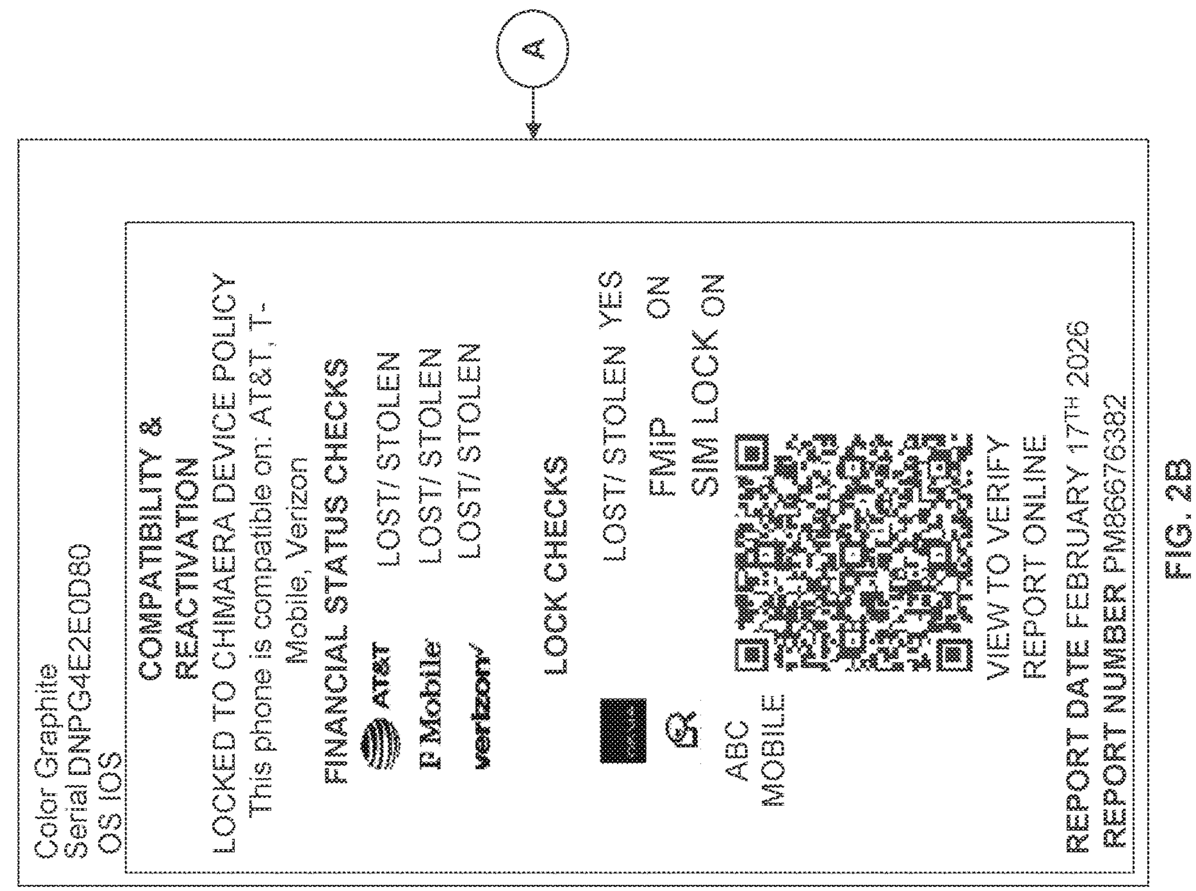
Figure 3A:
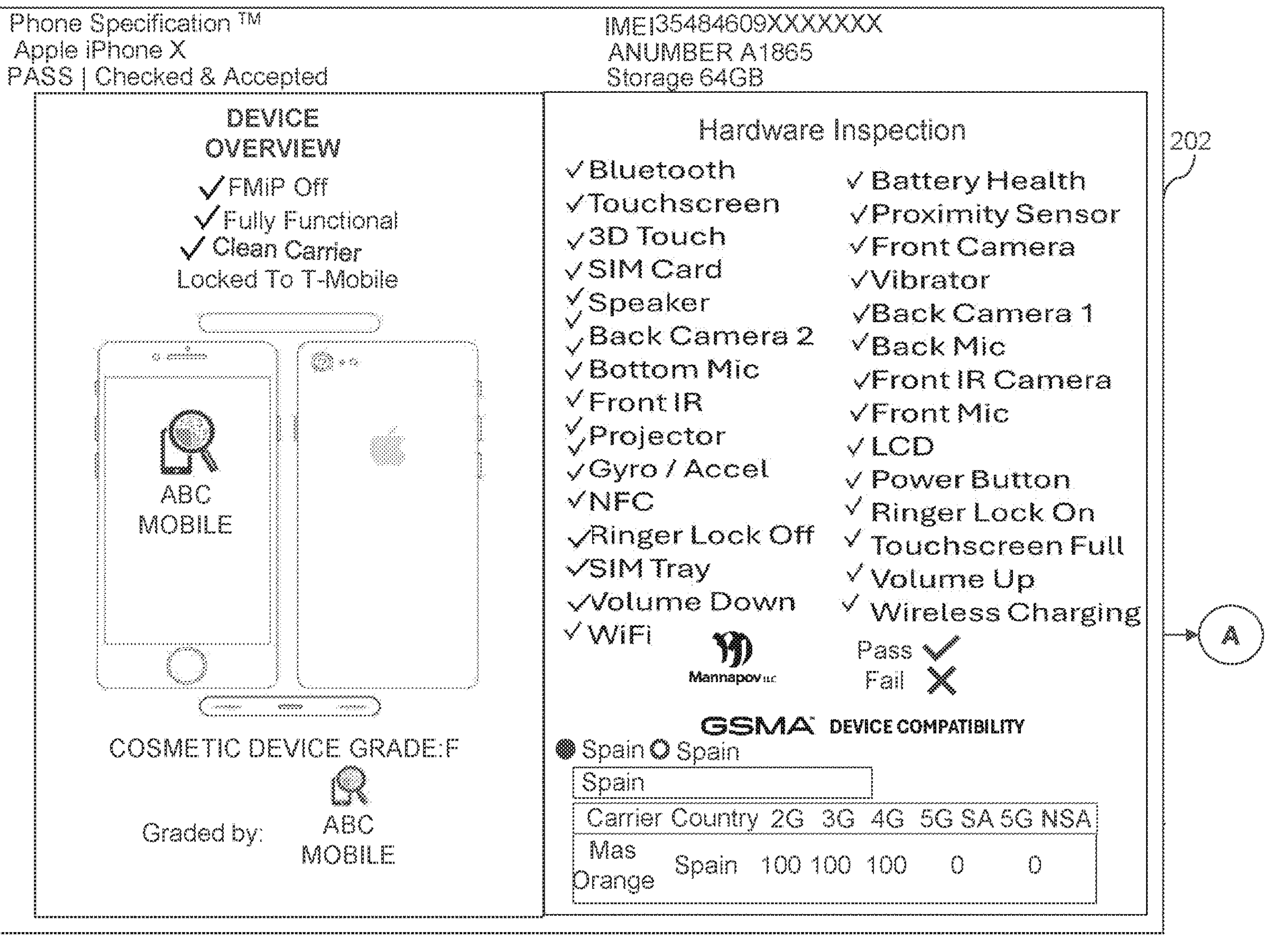
FIG. 3A-3B illustrates exemplary visual representations depicting the one or more credential-verified trust certificates that shows IPSR of the device, in accordance with an embodiment of the present disclosure.
Figure 3B:
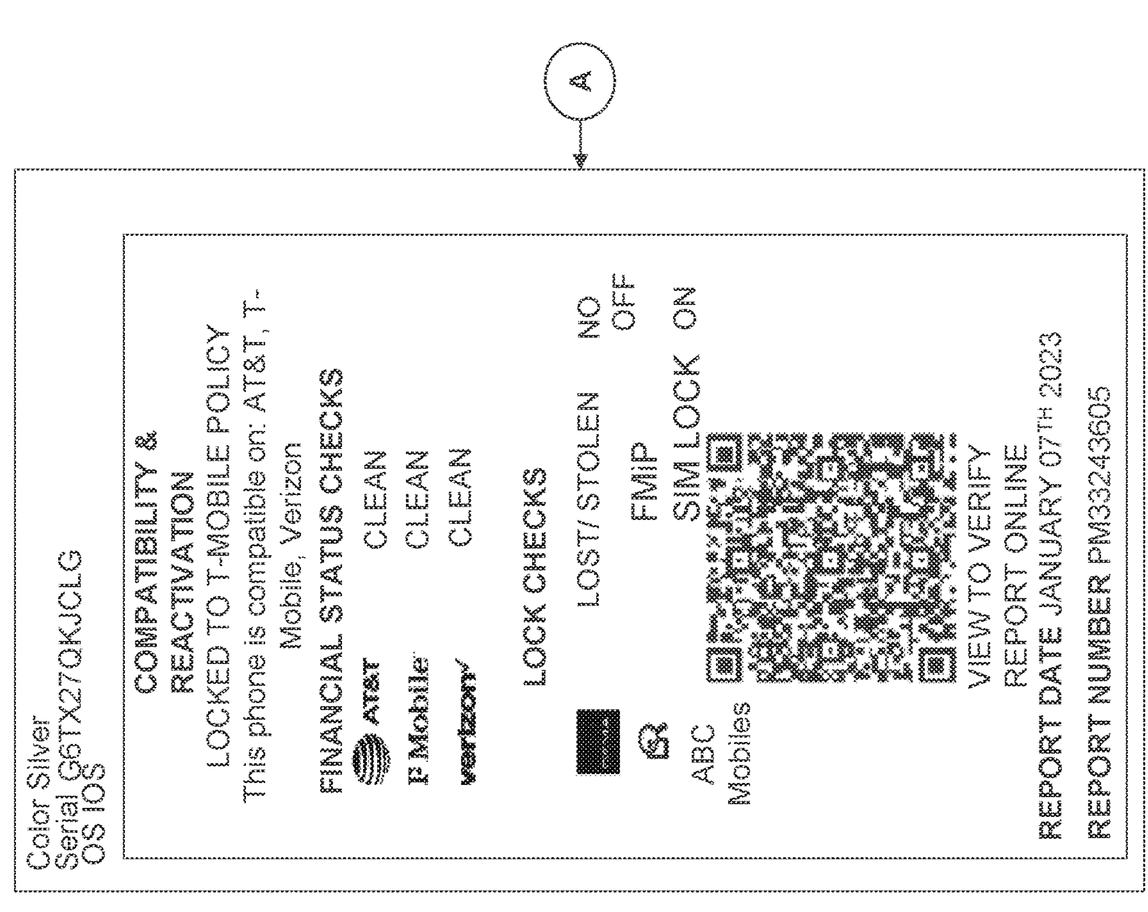

FIG. 1A illustrates an exemplary block diagram representation of a network architecture 100 depicting a computer-implemented system 102 for automatically managing one or more digital records and one or more credential-verified trust certificates 118 generated for the one or more radio-connected electronic devices 120 (the one or more radio-connected electronic devices 120 and the devices 120 are used interchangeably), in accordance with an embodiment of the present disclosure;

FIG. 1B illustrates an exemplary diagram of the computer-implemented system 102 for creating, managing, and reproducing the one or more credential-verified trust certificates 118 including the one or more digital reports about the one or more radio-connected electronic devices 120, in accordance with an embodiment of the present disclosure;

FIG. 2A-2B illustrate exemplary visual representations depicting the one or more credential-verified trust certificates 118 that shows interactive product status record (IPSR) of the device 120 (e.g., bad device), in accordance with an embodiment of the present disclosure; and FIG. 3A-3B illustrate exemplary visual representations depicting the one or more credential-verified trust certificates 118 that shows the IPSR of the device 120 (e.g., good device), in accordance with an embodiment of the present disclosure.

According to an exemplary embodiment of the present disclosure, the network architecture 100 may include the computer-implemented system 102 (the computer-implemented system 102 and system 102 are used interchangeably), one or more databases 116, and one or more communication devices 114. In an embodiment, the computer-implemented system 102/the system 102 may be a trust certificate management system, or any other systems related to management of the trust certificates (i.e., the one or more verifiable credential-based trust certificates). The system 102, the one or more databases 116, and the one or more communication devices 114 may be communicatively coupled via one or more communication networks 112, ensuring seamless data transmission, processing, and decision-making. The system 102 acts as a central processing unit within the network architecture 100, responsible for generating the one or more verifiable credential-based trust certificates 118 for the one or more radio-connected electronic devices 120. The system 102 is configured to execute a set of computer-readable instructions that control a plurality of subsystems 110.

The present invention with the system 102 is configured to automatically manage the one or more digital records (i.e., the unique device identification numbers, device characteristic information and technical specifications, hardware/electronic/radio status and technical functionality, fault factors and repair activities, and other functionality) of the one or more radio-connected electronic devices 120 throughout its lifecycle based on the generation of the one or more verifiable credential-based trust certificates 118 for the one or more radio-connected electronic devices 120. The system 102 is configured to identify the one or more radio-connected electronic devices 120 through one or more unique identifiers available for the one or more radio-connected electronic devices 120. In an embodiment, the one or more unique identifiers are standards-based unique device identifiers comprising at least one of: International Mobile Equipment Identity (IMEI), Embedded Identity Document (EID), and serial number. The one or more unique identifiers indicate device data attributes including at least one of: visible attributes comprising make and model information, non-visible attributes, and non-disclosed attributes including modem radio configuration and capabilities.

The system 102 is further configured to determine a profile of the one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices 120. The system 102 is further configured to generate the one or more credential-verified trust certificates 118 by integrating data associated with the one or more digital records and profiles corresponding to each identified radio-connected electronic device 120 in a data model framework (such as the UNTP) to support transparency and traceability of data reports about a device. The system 102 is further configured to determine, for the one or more radio-connected electronic devices 120, one or more first reports applicable to the associated profile of a radio-connected electronic device 120 regarding the ability of the radio-connected electronic device 120 to be identified, differentiated from another radio-connected electronic device, transacted, associated with a new user account, authenticated by a manufacturer/OEM for at least one of: warranty and registration, and connected to a cellular network as intended.

The system 102 is further configured to determine, for the one or more radio-connected electronic devices 120, one or more second reports applicable to the associated profile of the radio-connected electronic device 120 regarding one or more reports about functional, technical, operational, physical, and cosmetic states, condition, status, and capabilities of the radio-connected electronic device 120 in terms of the ability to use a radio-connected electronic device 120 as intended by a new user. The system 102 is further configured to determine, for the one or more radio-connected electronic devices 120, determine one or more third reports applicable to certified end-of-life processing, comprising secure erasure, physical destruction, and material recovery of the one or more radio-connected electronic devices 120. The system 102 is further configured to determine owner-imposed anti-theft encumbrances and locks to prevent unauthorized transaction and re-use of the radio-connected electronic device 120 by another end-user as the one or more first reports based on at least one of: a device manufacturer, an owner, and asset management user of the one or more radio-connected electronic devices 120, impacting the ability to be acquired by and subsequently utilized by a new owner without a reduction in operational capabilities.

In an embodiment, the system 102 is further configured to determine ownership encumbrances based on one or more registration services such as those associated with Global System for Mobile Communications Association (GSMA) along with external registration services as well (finance/insurance sectors, asset management, and the like), to indicate to one or more users that the one or more radio-connected electronic devices 120 are not available for ownership transaction. The system 102 is further configured to determine network-imposed device locks and encumbrances indicating that the radio-connected electronic device 120 is locked due to at least one of: claim of contract disputes, purchase obligations, unpaid service fees, and unsatisfied obligation in which the prior owner's mobile network has locked the radio-connected electronic device 120 to a network associated with the radio-connected electronic device 120. Such encumbrances prevent a new user of the device from using the device as intended, may block a device from utilizing another network, or restrict activation on a network or to the new user.

The system 102 is further configured to determine one or more compatibility scores of the one or more radio-connected electronic devices 120 with an intended operational locality through use of a device compatibility service for at least one of: a country and a mobile network operator in a country. The one or more compatibility scores are determined through input from at least one of a user profile and a recognized user for compatibility scoring of the one or more radio-connected electronic devices 120 for at least one of: a country and a network not already contained in a compatibility scoring report for the radio-connected electronic device 120. The system 102 is further configured to access, analyze, and associate the one or more first reports, the one or more second reports, and the one or more third reports to the one or more radio-connected electronic devices 120, indicating the ability of the one or more radio-connected electronic devices 120 to be identified, differentiated, transacted, and operated as intended by the new user.

The system 102 is further configured to determine one or more certifications and credentials of the plurality of source provenance certified data sources and verified identity data sources, that provide the one or more first reports applicable to device identification and entitlement, the one or more second reports applicable to the functional, technical, and cosmetic status and condition, and the one or more third reports applicable to certified device destruction through a certified device destruction facility, with regard to the one or more radio-connected electronic devices 120. The system 102 is further configured to provide and transmit the determined one or more first reports, one or more second reports, and one or more third reports of the one or more radio-connected electronic devices 120 in a trust certificate format, to one or more requesting users through one or more user interface methods implemented by one or more communication devices 114 of the one or more requesting users and process and support user interaction regarding incremental or refreshed reports.

In an exemplary embodiment, the system 102 comprises one or more servers 104. The one or more servers 104 may comprise a combination of discrete components, an integrated circuit, an application-specific integrated circuit, a field-programmable gate array, a digital signal processor, or other suitable hardware, including cloud-based computing instances. The "software" may comprise one or more objects, agents, threads, lines of code, subroutines, separate software applications, two or more lines of code, or other suitable software structures operating in one or more software applications or one or more hardware processors 106.

The one or more servers 104 comprise the one or more hardware processors 106 and a memory unit 108. The memory unit 108 is operatively connected to the one or more hardware processors 106. The memory unit 108 comprises a set of computer-readable instructions in the form of the plurality of subsystems 110, configured to be executed by the one or more hardware processors 106.

In an exemplary embodiment, the one or more hardware processors 106 may include, for example, microprocessors, microcomputers, microcontrollers, digital signal processors, central processing units, state machines, logic circuits, and/or any devices that manipulate data or signals based on operational instructions. Among other capabilities, the one or more hardware processors 106 may fetch and execute computer-readable instructions in the memory unit 108 (also referred as memory 108) operationally coupled with the system 102 for performing tasks such as data processing, input/output processing, and/or any other functions. Any reference to a task in the present disclosure may refer to an operation being or that may be performed on data. The one or more hardware processors 106 are high-performance processors capable of handling large volumes of data and complex computations. The one or more hardware processors 106 may be, but not limited to, at least one of: multi-core central processing units (CPU), graphics processing units (GPUs), and the like, that enhance an ability of the system 102 to process real-time data from one or more sources simultaneously.

In an exemplary embodiment, the one or more databases 116 may be configured to store and manage data using data models and data model frameworks related to various aspects of the system 102. The one or more databases 116 may store at least one of, but not limited to, device data, verifiable credentials, diagnostic reports, ownership and encumbrance data, crime and loss reports, compatibility scores, device lifecycle history, repair and refurbishment logs, circular economy transaction data, trust certificate metadata, configuration preferences associated with the one or more radio-connected electronic devices 120, any other information necessary for the functionality and optimization of the system 102, and the like. The one or more databases 116 serve as a centralized repository for critical data elements that are integral to the secure operation of the system 102, enabling efficient generation of the verifiable credential-based trust certificates 118 for the one or more radio-connected electronic devices 120. The one or more databases 116 enable the system 102 to dynamically retrieve, analyze, and update the stored data in real-time, for generating the verifiable credential-based trust certificates 118 for the one or more radio-connected electronic devices 120. The one or more databases 116 may include different types of databases such as, but not limited to, relational databases (e.g., Structured Query Language (SQL) databases such as PostgresDB and Oracle® databases), non-Structured Query Language (NoSQL) databases (e.g., MongoDB, Cassandra), time-series databases (e.g., InfluxDB), an OpenSearch database, object storage systems (e.g., Amazon® S3), and the like.

In an exemplary embodiment, the one or more communication devices 114 are configured to enable one or more users to interact with the system 102. The one or more communication devices 114 may be digital devices, computing devices, and/or networks. The one or more communication devices 114 may include, but not limited to, a mobile device, a smartphone, a personal digital assistant (PDA), a tablet computer, a phablet computer, a wearable computing device, a laptop, a desktop, and the like.

In an exemplary embodiment, the one or more communication networks 112 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee®, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the system 102 may be implemented by way of a single device or a combination of multiple devices that may be operatively connected or networked together. The system 102 may be implemented in hardware or a suitable combination of hardware and software or virtual and/or cloud systems. Though few components and the plurality of subsystems 110 are disclosed in FIG. 1A, there may be additional components and subsystems which is not shown, such as, but not limited to, ports, routers, repeaters, firewall devices, network devices, the one or more databases 116, network attached storage devices, assets, machinery, instruments, facility equipment, emergency management devices, image capturing devices, any other devices, and combination thereof. The person skilled in the art should not be limiting the components/subsystems shown in FIG. 1A. Although FIG. 1A illustrates the system 102, and the one or more communication devices 114 connected to the one or more databases 116, one skilled in the art can envision that the system 102, and the one or more communication devices 114 may be connected to several user devices located at various locations and several databases 116 via the one or more communication networks 112.

Those of ordinary skilled in the art will appreciate that the hardware depicted in FIG. 1A may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure. Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

FIG. 2A-2B illustrate exemplary visual representations depicting the one or more credential-verified trust certificates 118 that shows interactive product status record (IPSR) 202 of the device 120 (e.g., bad device), in accordance with an embodiment of the present disclosure. The device 120 is analyzed to be the bad device based on the IPSR 202 comprising at least one of: device overview (such as lost/stolen, FMiP ON, repairs needed, carrier issue, and the like), hardware inspection (including features such as device erasure or repairs needed for at least one of: microphone 1, microphone 2, Bluetooth, physical buttons, vibration, touch ID, touchscreen, GPS signal, gyroscope, accelerometer, and the like), and compatibility and re-activation (such as financial status checks with lost/stolen results, and lock checks) in the verifiable credential-based trust certificate 118, as shown in FIG. 2A-2B. FIG. 2A-2B, the circular symbol with "A" written inside is being used as an off-page connector. This is used for indicating that FIG. 2A continues in the next page as FIG. 2B.

FIG. 3A-3B illustrate exemplary visual representations depicting the one or more credential-verified trust certificates 118 that shows the IPSR 202 of the device 120 (e.g., good device), in accordance with an embodiment of the present disclosure. The device 120 is analyzed to be the good device based on the IPSR 202 comprising at least one of:

device overview (such as lost/stolen, FMiP ON, repairs needed, carrier issue, and the like), hardware inspection (including features such as device erasure or repairs needed for at least one of: Bluetooth, battery health, touchscreen, 3D touch, SIM card, speaker, vibrator, back Mic, and the like), and compatibility and re-activation (such as financial status checks with clean results and lock checks) in the verifiable credential-based trust certificate 118, as shown in FIG. 3A-3B. The requesting user may interact/scan with the verifiable credential-based trust certificate 118 to verify the IPSR of the device 120 online. FIG. 3A-3B, the circular symbol with "A" written inside is being used as an off-page connector. This is used for indicating that FIG. 3A continues in the next page as FIG. 3B.

Figure 4:
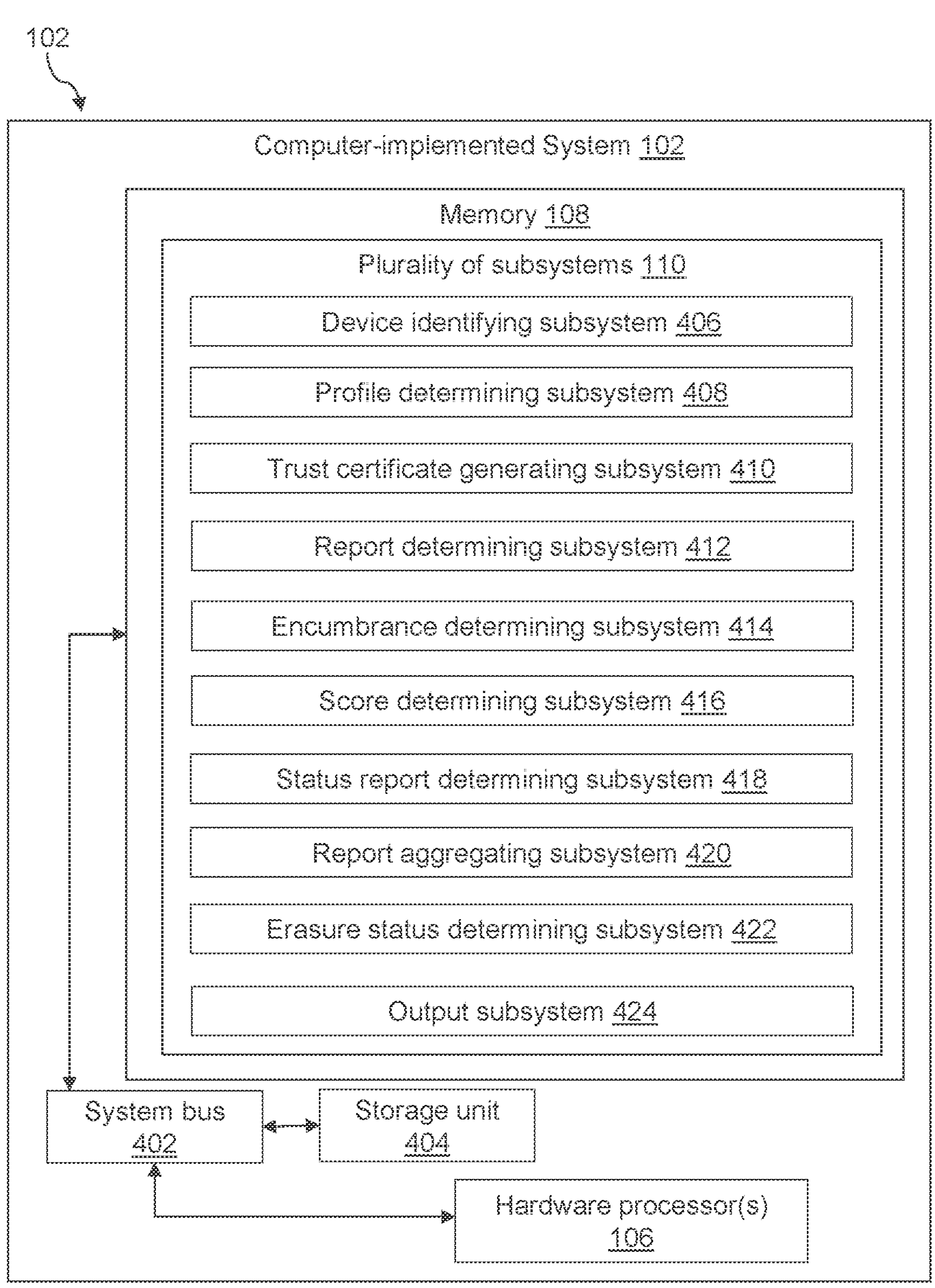
FIG. 4 illustrates an exemplary block diagram representation of the computer-implemented system, such as those shown in FIG. 1A, for automatically managing the one or more digital records and the one or more credential-verified trust certificates of the one or more radio-connected electronic devices, in accordance with an embodiment of the present disclosure.

FIG. 4 illustrates an exemplary block diagram representation of the computer-implemented system 102 (otherwise referred as system 102), such as those shown in FIG. 1A, for automatically managing the one or more digital records of the one or more radio-connected electronic devices 120 based on the generation of the one or more credential-verified trust certificates 118, in accordance with an embodiment of the present disclosure.

In an exemplary embodiment, the system 102 comprises the one or more hardware processors 106, the memory unit 108, and a storage unit 404. The one or more hardware processors 106, the memory unit 108, and the storage unit 404 are communicatively coupled through a system bus 402 or any similar mechanism. The system bus 402 functions as the central conduit for data transfer and communication between the one or more hardware processors 106, the memory unit 108, and the storage unit 404. The system bus 402 facilitates the efficient exchange of information and instructions, enabling the coordinated operation of the system 102. The system bus 402 may be implemented using various technologies, including but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 108 is operatively connected to the one or more hardware processors 106. The memory unit 108 comprises the plurality of subsystems 110 in the form of programmable instructions executable by the one or more hardware processors 106. The plurality of subsystems 110 comprises a device identifying subsystem 406, a profile determining subsystem 408, a trust certificate generating subsystem 410, a report determining subsystem 412, an encumbrance determining subsystem 414, a score determining subsystem 416, a status report determining subsystem 418, a report aggregating subsystem 420, an erasure status determining subsystem 422, and an output subsystem 424.

The one or more hardware processors 106 associated within the one or more servers 104, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 106 may also include embedded controllers, such as generic or programmable logic devices or arrays, application-specific integrated circuits, single-chip computers, and the like. The memory unit 108 may be the non-transitory volatile memory and the non-volatile memory. The memory unit 108 may be coupled to communicate with the one or more hardware processors 106, such as being a computer-readable storage medium. The one or more hardware processors 106 may execute machine-readable instructions and/or source code stored in the memory unit 108. A variety of machine-readable instructions may be stored in and accessed from the memory unit 108. The memory unit 108 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 108 includes the plurality of subsystems 110 stored in the form of machine-readable instructions on any of the above-mentioned storage media and may be in communication with and executed by the one or more hardware processors 106.

The memory unit 108 may be the non-transitory volatile memory and the non-volatile memory. The memory unit 108 may be coupled to communicate with the one or more hardware processors 106, such as being a computer-readable storage medium. The one or more hardware processors 106 may execute machine-readable instructions and/or source code stored in the memory unit 108. A variety of machine-readable instructions may be stored in and accessed from the memory unit 108. The memory unit 108 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 108 includes the plurality of subsystems 110 stored in the form of machine-readable instructions on any of the above-mentioned storage media and may be in communication with and executed by the one or more hardware processors 106.

The storage unit 404 may be a cloud storage or the one or more databases 116 such as those shown in FIG. 1A. The storage unit 404 may store, but not limited to, recommended course of action sequences dynamically generated by the system 102. The action sequences comprise device identification, profile determination, trust certificate generation, report determination, encumbrance determination, compatibility score assessment, status report determination, and the like. The action sequences further comprise data obtaining, device record ingestion, device record determination, third party data integration, third party system interrogation, diagnostic assessment, identity and credentials management, data interrogation scheduling, device change management, notifications transmitting, and the like. Additionally, the storage unit 404 may retain previous action sequences for comparison and future reference, enabling continuous refinement of the system 102 over time. The storage unit 404 may be any kind of database such as, but not limited to, relational databases, dedicated databases, dynamic databases, monetized databases, scalable databases, cloud databases, distributed databases, any other databases, and a combination thereof.

In an exemplary embodiment, the one or more radio-connected electronic devices 120 may include, but not constricted to, at least one of: smartphones, tablets, wearable devices, laptops with SIM or eSIM capability, and the like.

The plurality of subsystems 110 includes the device identifying subsystem 406 that is communicatively connected to the one or more hardware processors 106. The device identifying subsystem 406 is configured to identify the one or more radio-connected electronic devices 120 through the one or more standards-based unique device identifiers available for the one or more radio-connected electronic devices 120. In an embodiment, the one or more unique identifiers may include at least one of: International Mobile Equipment Identity (IMEI), Embedded Identity Document (EID), serial number, and the like. The one or more unique identifiers indicate device data attributes including at least one of: visible attributes comprising make and model information, physical, technical, functional and costmetic attributes, and non-visible attributes and non-disclosed attributes including modem radio configuration and capabilities, associated with the one or more radio-connected electronic devices 120.

The plurality of subsystems 110 includes the profile determining subsystem 408 that is communicatively connected to the one or more hardware processors 106. The profile determining subsystem 408 is configured to determine the profile of the one or more radio-connected electronic devices 120 from the one or more first reports, the one or more second reports, and the one or more third reports from the plurality of source provenance certified data sources using data models and data model frameworks to generate a digital twin representation of each identified radio-connected electronic device of the one or more radio-connected electronic devices 120.

For determining the profile of the radio-connected electronic device 120, the profile determining subsystem 408 is configured to: (a) obtain the one or more digital records from the plurality of source provenance certified data sources including at least one of: an internal synthesized device data repository, an internal source of electronic device digital product passport (DPP), an external source of electronic device digital product passport, device conformity and certification records, manufacturer-contributed data, mobile network-contributed data, hardware diagnostics report data, erasure report data, crime report data, owner-managed anti-theft encumbrances, network-managed encumbrances, financial encumbrances, repair reports, refurbishment and hardware replacement reports, intervention reports, and destruction reports from one or more processors across one or more lifecycle stages of the one or more radio-connected electronic devices 120; (b) validate the authenticity and credentials of each source provenance certified data source by verifying digital signatures, certificate chains, and determining whether certificates have not expired; (c) normalize the one or more digital records received from the plurality of source provenance certified data sources to accommodate variations in data formats, terminology, and structure while maintaining data integrity in describing at least one of: an aspect, component, and capability of the radio-connected electronic device; (d) map the one or more digital records to the corresponding identified radio-connected electronic device in a data model and data model framework using the one or more standards-based unique device identifiers comprising at least one of: the IMEI, the EID, and the serial number; (e) categorize the one or more digital records by record type, data source origin, and lifecycle stage to organize information systematically; (f) associate subsets of the one or more digital records with default trust certificate profiles while maintaining additional digital records available for unabridged certificate inclusion; (g) aggregate the one or more digital records from the plurality of source provenance certified data sources for each identified radio-connected electronic device to determine the device profile; (h) rectify conflicts between the one or more digital records from the plurality of source provenance certified data sources and data models and frameworks by applying a hierarchy and ranking system and methodology based on factors comprising at least one of: source authority, data provenance, industry certifications, and recentness; and (i) update the profile of the one or more radio-connected electronic devices when at least one of: new information becomes available from the plurality of source provenance certified data sources, and existing records are modified.

The plurality of subsystems 110 further includes the trust certificate generating subsystem 410 that is communicatively connected to the one or more hardware processors 106. The trust certificate generating subsystem 410 is configured to generate the one or more credential-verified trust certificates by integrating the data associated with the one or more digital records and profiles corresponding to each identified radio-connected electronic device 120 in data model frameworks (such as the UNTP) to support transparency and traceability of data reports about a device. The trust certificate generating subsystem 410 is a specialized cryptographic processing component that creates verifiable, tamper-evident digital certificates by systematically combining and securing the comprehensive device profile information obtained from the profile determining subsystem 408 into structured, authenticated documents that can be cryptographically verified by third parties.

For generating the one or more credential-verified trust certificates, the trust certificate generating subsystem 410 is initially configured to: (a) retrieve the profile of one or more digital records corresponding to each identified radio-connected electronic device 120 from the profile determining subsystem 408, (b) analyze the retrieved digital records to identify completeness and quality of data available for trust certificate generation, (c) select corresponding digital records from the profile based on trust certificate requirements, user preferences, and marketplace specifications, (d) integrate the selected digital records by combining information about device identification and provenance, physical status, technical status, operational status and associated faults, cosmetic condition, hardware repair and refurbishment interventions, destruction status, indication of utilization of non-OEM parts, status of operational encumbrances and locks and asset management and protection services, and device compatibility scoring; (e) apply cryptographic processes to secure the integrated data, comprising generation of digital signatures and hash values for data integrity verification; (f) bind the integrated data to the identity of the issuing authority using cryptographic methods to establish trust and authenticity; (g) embed metadata into the one or more credential-verified trust certificates comprising certificate identifier, issuer information, issuance timestamp, expiration date, and validation mechanisms; (h) generate centralized format trust certificates compliant with traditional Public Key Infrastructure and decentralized format trust certificates compatible with blockchain and distributed ledger technologies; (i) store the generated one or more credential-verified trust certificates in a secure repository with corresponding access controls and audit logging; (j) create unique access mechanisms for each trust certificate comprising certificate codes, secure QR codes, hypertext links, RFID chip associations, and API endpoints for certificate retrieval; (k) establish validation pathways for recipients to verify the authenticity and integrity of the one or more credential-verified trust certificates through cryptographic verification processes; and (I) maintain version control of the one or more credential-verified trust certificates to track updates and modifications while preserving historical certificate states for audit purposes.

The plurality of subsystems 110 further includes the report determining subsystem 412 that is communicatively connected to the one or more hardware processors 106. The report determining subsystem 412 is configured to determine, for the one or more radio-connected electronic devices 120, the one or more first reports applicable to the associated profile of a radio-connected electronic device regarding the ability of the radio-connected electronic device 120 to be identified, differentiated from another radio-connected electronic device, transacted, associated with a new user account, authenticated by a manufacturer/OEM for at least one of: DPP, warranty and registration, and connected to a cellular network as intended.

The report determining subsystem 412 is further configured to determine, for the one or more radio-connected electronic devices 120, the one or more second reports applicable to the associated profile of the radio-connected electronic device 120 regarding one or more reports about functional, technical, operational, physical, and cosmetic states, condition, status, and capabilities of the radio-connected electronic device 120 in terms of the ability to use the radio-connected electronic device 120 as intended by the new user. The report determining subsystem 412 is further configured to determine, for the one or more radio-connected electronic devices 120, the one or more third reports applicable to the certified end-of-life processing, comprising secure erasure, physical destruction, and material recovery of the one or more radio-connected electronic devices 120.

The one or more third reports applicable to the one or more radio-connected electronic devices 120 indicating certified device destruction through a certified device destruction facility (official documentation that verifies the complete and irreversible destruction of radio-connected electronic devices 120 by third-party certified IT asset and data destruction facilities that specialize in secure device disposal, such as certified e-waste recycling centers, data destruction services, military-grade disposal facilities, or industry-certified device destruction companies that follow industry-recognized protocols for permanently rendering devices inoperable and unrecoverable) are specialized verification documents that provide authoritative confirmation that specific radio-connected electronic devices 120 have been permanently destroyed through proper channels, ensuring that devices cannot be recovered, refurbished, or returned to operational use, thereby providing definitive lifecycle closure and preventing future unauthorized use or security risks associated with improperly disposed devices.

The plurality of subsystems 110 further includes the encumbrance determining subsystem 414 that is communicatively connected to the one or more hardware processors 106. The encumbrance determining subsystem 414 is configured to determine the owner-imposed anti-theft locks and encumbrances to prevent unauthorized transaction and re-use of the radio-connected electronic device 120 by another end-user as the one or more first reports based on at least one of: a device manufacturer, an owner, and asset management user of the one or more radio-connected electronic devices 120, impacting the ability to be acquired by and subsequently utilized by a new owner without a reduction in operational capabilities. The encumbrance determining subsystem 414 is further configured to determine the network-imposed device locks and encumbrances indicating that the radio-connected electronic device 120 is locked, due to at least one of: claim of contract disputes, purchase obligations, unpaid service fees, and unsatisfied obligation in which the prior owner's mobile network has locked the radio-connected electronic device 120 to or from the network associated with the radio-connected electronic device 120.

The plurality of subsystems 110 further includes the score determining subsystem 416 that is communicatively connected to the one or more hardware processors 106. The score determining subsystem 416 is configured to determine one or more compatibility scores of the one or more radio-connected electronic devices 120 with an intended operational locality through use of a device compatibility service for at least one of: a country and a mobile network operator in a country. The one or more compatibility scores are determined through input from at least one of: a user profile, and a recognized user requesting compatibility scoring of the one or more radio-connected electronic devices 120 for at least one of: a country and a network not already contained in a compatibility scoring report for the radio-connected electronic device 120.

For determining the one or more compatibility scores of the one or more radio-connected electronic devices 120, the score determining subsystem 416 is configured to: (a) receive requests for compatibility scoring of the one or more radio-connected electronic devices with an intended operational locality, wherein the requests specify at least one of: a country, and a mobile network operator in a country; (b) obtain device technical specifications from the device identifying subsystem, wherein the device technical specifications comprise radio and frequency capabilities, supported network technologies, frequency bands, modem and antenna configurations, in supporting communication using second-generation GSM (2G), third-generation UMTS (3G), fourth-generation LTE (4G), fifth-generation NR (5G) Non-Standalone (NSA), and NR 5G Standalone (SA) network technologies and emerging technologies; (c) retrieve network operator specifications for the specified one or more countries and the one or more mobile network operators, wherein the network operator specifications comprise frequency bands, network technologies, spectrum assignments, and technical requirements deployed by, licensed by, and authorized for use for network implementation; (d) access trust certificate user profile information when available, wherein the user profile information comprises default selection data for preferred countries and network operators; (e) provide interactive mechanisms for the one or more users to request additional compatibility assessments for country and mobile network operator combinations not previously evaluated, resulting in incremental updates to the device compatibility scoring reports; (f) process input from a recognized user for incrementally adding utilization context about the one or more radio-connected electronic devices, wherein the utilization context comprises an intended country and one or more networks in a country for inclusion in a digital report; (g) perform technical compatibility analysis by comparing the device technical specifications against the network operator specifications to determine radio frequency alignment, network technology compatibility, and spectrum band support; (h) determine quantitative compatibility scores based on technical alignment metrics, wherein the quantitative compatibility scores represent percentage compatibility; (i) generate qualitative compatibility assessments based on operational suitability, wherein the qualitative compatibility assessments comprise compatibility ratings; (j) generate time-stamped device compatibility scoring reports that document the compatibility analysis results, methodology used, internal data sources, and validity period of the qualitative compatibility assessments; (k) store the device compatibility scoring reports as digital records associated with the corresponding radio-connected electronic device for future reference and trust certificate inclusion; and (I) update the one or more compatibility scores when the network operator specifications change, new spectrum assignments occur, and device technical specifications are modified.

The plurality of subsystems 110 further includes the status report determining subsystem 418 that is communicatively connected to the one or more hardware processors 106. The status report determining subsystem 418 is configured to access, analyze and associate the one or more first reports, the one or more second reports, and the one or more third reports to the one or more radio-connected electronic devices 120, indicating the ability of the one or more radio-connected electronic devices 120 to be identified, differentiated, transacted, and operated as intended by the new user using data models and data model frameworks to support transparency and traceability in associating reports to a device. The status report determining subsystem 418 is a comprehensive evaluation component that analyzes, assesses and documents the current operational condition, functional capabilities, technical status, and readiness status of radio-connected electronic devices 120 to determine whether the radio-connected electronic devices 120 can perform all expected functions and services that a prospective new owner would reasonably anticipate from a fully operational device in normal working condition.

The plurality of subsystems 110 includes the report aggregating subsystem 420 that is communicatively connected to the one or more hardware processors 106. The report aggregating subsystem 420 is configured to aggregate at least one of: the one or more first reports, the one or more second reports, and the one or more third reports, along with encumbrance reports, crime reports, network compatibility assessments, diagnostic reports, repair history and parts replacement records, associated with the one or more radio-connected electronic devices 120. The aggregation of the reports is a comprehensive data consolidation process that systematically combines and organizes multiple categories of device-related documentation into unified, structured collections using data models and data model frameworks that provide complete device lifecycle intelligence by bringing together connectivity reports, compliance assessments, destruction certifications, restriction analyses, compatibility evaluations, and maintenance and other records into cohesive information data sets about a device.

The report aggregating subsystem 420 is further configured to analyze, normalize, and rank the reports about the one or more radio-connected electronic devices 120 to represent the physical, technical, cosmetic status and capabilities of the radio-connected electronic device 120 in shared and common terminology accounting for differences in report language among data sources about the same device aspect. The report aggregating subsystem 420 is further configured to export the one or more credential-verified trust certificates to an identity of an issuing authority, for validating the one or more credential-verified trust certificates by a recipient system through a cryptographic verification process supporting centralized and decentralized modes of operation. The export of the one or more credential-verified trust certificates is a comprehensive certificate distribution and validation framework that transfers cryptographically secured device documentation to designated certificate authorities and enables flexible verification mechanisms that accommodate both traditional centralized validation systems and modern decentralized verification architectures.

The report aggregating subsystem 420 is further configured to store the one or more digital records in the one or more credential-verified trust certificates. The one or more digital records comprise (a) information from one or more verified identity data sources, with the one or more credential-verified trust certificates comprising at least one of: a representation of the information, a report generating party, a unique report identifier, and a cryptographic signature, (b) one or more authoritative records, from the one or more source provenance certified data sources or verified identity data sources, summarizing the one or more radio-connected electronic devices through at least one of: the one or more unique identifiers, the device manufacturer, brand, product model name, model codes, color, and identification of the device data attributes, associated with the one or more radio-connected electronic devices, and (c) the one or more authoritative records, from the one or more source provenance certified data sources or verified identity data sources, summarizing and aggregating records and reports comprising at least one of: an internal synthesized device data repository, an internal source of electronic device digital product passport, an external source of electronic device digital product passport, device conformity and certification records, manufacturer contributed data, mobile network contributed data, and third party data comprising at least one of: hardware diagnostics report data, erasure report data, crime report data, owner-managed anti-theft locks and encumbrances, mobile network managed locks and encumbrances, financial encumbrances, repair reports, refurbishment and hardware replacement reports, intervention reports, and destruction reports from one or more processors across one or more lifecycle stages of the one or more radio-connected electronic devices; and (d) the authoritative records from the one or more source provenance certified data sources or verified identity data sources summarizing and aggregating records and reports certifying the destruction of the one or more radio-connected electronic devices 120 from one or more processors across one or more lifecycle stages of the one or more radio-connected electronic devices, wherein the one or more lifecycle stages of the one or more radio-connected electronic devices comprise parts repair activity and replacement activity comprising information about parts used in activities.

For exporting the one or more credential-verified trust certificates to the identity of the issuing authority, the report aggregating subsystem 420 is initially configured to utilize a verifiable credential framework from at least one of: traditional public key infrastructure (PKI) using privately signed digital signatures, certificate authorities (CA), X.509 standards, compatible standards, decentralized W3C verifiable credentials (VC), decentralized identifiers (DID), Ethereum smart contracts, Hyperledger smart contracts, permissioned blockchain, blockchain, and smart contract logic. The verifiable credential framework is a comprehensive cryptographic and trust establishment system that provides multiple technological approaches for creating, validating, and managing digital credentials by leveraging established and emerging frameworks that ensure certificate authenticity, integrity, and verifiability across diverse technological environments and organizational requirements.

For exporting the one or more credential-verified trust certificates to the identity of the issuing authority, the report aggregating subsystem 420 is further configured to support certificate transparency and security through cryptographically verifiable logs, auditing of the cryptographically verifiable logs, and validating credentials of the one or more users contributing the reports to the one or more credential-verified trust certificates.

In an embodiment, validating the credentials of the one or more users comprises verifying digital signature of public key of a certificate authority, validating a certificate chain, and determining whether certificates have not expired using Online Certificate Status Protocol (OCSP) and Certificate Revocation Lists (CRLs). Validating the credentials of the one or more users is a comprehensive multi-step authentication process that confirms the legitimacy and current validity of digital credentials presented by users who contribute reports to trust certificates by systematically checking cryptographic signatures, certificate hierarchies, and revocation status to ensure only authorized entities can provide information for inclusion in credential-verified trust certificates.

In an embodiment, the one or more credential-verified trust certificates are generated in at least one of: a centralized and a decentralized verifiable credential framework and format. The report aggregating subsystem 420 may create trust certificates in both traditional hierarchical certificate structures and modern decentralized credential formats to ensure broad compatibility across diverse technological environments and organizational requirements while enabling recipient systems to validate the one or more credential-verified trust certificates.

For validating the one or more credential-verified trust certificates, the report aggregating subsystem 420 is configured to use an access by the one or more users of the one or more credential-verified trust certificates through a secure data mechanism comprising use of an application programming interface (API) and hypertext transfer protocol (HTTP) request as represented by a certificate code, a secure QR code, a hypertext link, radio frequency identification (RFID) chip, API, one or more machine inter-operable methods to provide access to the one or more credential-verified trust certificates, through at least one of: a computer-based application, website, utilization of public-facing access method, machine-readable mechanism, and a scannable method.

For validating the one or more credential-verified trust certificates, the report aggregating subsystem 420 is further configured to use interaction by a user of one or more credential-verified trust certificates, to at least one of: request, order, commission, and procure generation of the one or more digital records for incorporating the one or more digital records in the one or more credential-verified trust certificates and to request for updating current status of the one or more digital records currently stored in the one or more credential-verified trust certificates.

For validating the one or more credential-verified trust certificates, the report aggregating subsystem 420 is further configured to facilitate the user interaction to request the one or more qualitative and quantitative compatibility scores for the one or more countries and the one or more mobile network operators excluded in the one or more credential-verified trust certificates as a digital record related to the one or more radio-connected electronic devices 120. For validating the one or more credential-verified trust certificates, the report aggregating subsystem 420 is further configured to allow user access to detailed representations of a verifiable digital record contained in the credential-verified trust certificate about a radio-connected electronic device, where such representations are available and sharing permissions support disclosure to a recipient of the verifiable digital record using data models and data model frameworks to support transparency and traceability in product lifecycle reporting. The verifiable digital records may include at least one of: one or more of a device status check, a diagnostics report, an erasure report and reports of the hardware and software systems and subsystems, overall technical capabilities, and an encumbrance report, indicating detailed data points comprising date of the report, the system queried, an intent of the report, specific outcomes and sub-outcomes of the report, accompanying the detailed content of the verifiable digital record.

For validating the one or more credential-verified trust certificates, the report aggregating subsystem 420 is further configured to process the user interaction to request notifications on the one or more credential-verified trust certificates of the one or more radio-connected electronic devices, in which a change to at least one of: physical and software device status points, technical status of a hardware component, an operational encumbrance, is detected to update the one or more credential-verified trust certificates. The notifications utilize one or more formats comprise at least one of: electronic mail (Email), secure Email, certified Email, short message sent (SMS), electronic messaging, and API services, to request that an identity of the recipient is configured to receive a notification of the change and to provide an access method to the changes and the revised one or more credential-verified trust certificates. The user interaction to request notifications is a comprehensive change monitoring and alert system that enables the users to subscribe to automated notifications that are triggered when specific device-related conditions or status elements are modified, ensuring that interested parties are promptly informed of important changes to device trust certificates and provided with immediate access to updated certificate information.

For validating the one or more credential-verified trust certificates, the report aggregating subsystem 420 is further configured to manage recipient interaction to request cessation of notifications on the one or more credential-verified trust certificates by performing at least one of: pause, stop, set to be paused, and set to be stopped, on the changes to one or more device attributes, after a pre-determined period of time. In an embodiment, the report aggregating subsystem 420 is further configured to enable a user in one or a multiple of roles, such as a user of the general public, a website visitor, a member of a market service acting as a potential buyer, the seller of the device, the marketplace service, or for another interested party such as a telecommunications company or regulatory body, to configure one or more customization of settings about the trust certificate. Such settings may include action-based control permissions and subscriptions per user/user role per device for notifications in the event of, for example, a change of a device attribute, a new report, a transaction, and the like. The report aggregating subsystem 420 is further configured to enable one or more users of the system, in which the user has commissioned or otherwise authorized payment of service for issuance, update, or other adaptation or customization of the content or a report of the trust certificate. The trust certificate may be provided in any form, including but not limited to a full and complete inclusion of any and all available digital objects and records associated with the device, or a summarization or otherwise limited representation of a set of digital objects or records associated with the device, or any other subset of available digital objects or reports.

The report aggregating subsystem 420 is further configured to provide the ability to determine certificate update frequencies, methods, and triggers for a re-execution request of one or more specific digital reports. Update triggers may include time period references such as one time per week, or on demand such as with the click of a link or via any other interactive method, a purchase transaction, or via any other manual or automated or system-generated request. The report aggregating subsystem 420 is further configured to enable updates to the one or more encumbrance reports comprised in the trust certificate and its corresponding data sources, such as but not limited to mobile device crime reports, network encumbrances and any other externally originating encumbrance which may affect the device's technical ability to operate as expected by a new owner. The report aggregating subsystem 420 is further configured to enable one or more users to manage their device subscriptions and/or per-device notifications upon a status change of a subscribed device.

The report aggregating subsystem 420 is further configured to permit management of the data sources and storage mechanisms with regard to who is able to provide, store, submit or otherwise make available to the system 102, the one or more digital records about a device, including but not limited to the establishment of the data source's identification, certifications, certificate authorities, or other signing credentials of the data source and data source connection configuration. The report aggregating subsystem 420 utilizes structured data in support of data models and data model frameworks, such as the UNTP, to support use of standards-based device identifiers, data models, and structures, supporting auditability, governance, interconnectivity between systems and networks of system, and verification of reports about a device 120. The report aggregating subsystem 420 is further configured to permit management of any hierarchy, ranking, or ordering of data sources of digital objects or records in a trust certificate. The data sources contain information where one or more aspects of the device's physical and technical state, such as hardware, components and systems, sub-components and sub-systems, or operational statuses may be reflected in the one or more digital records. The report aggregating subsystem 420 is further configured to utilize a multi-variate scoring and/or ranking methodology to differentiate between more- or less-authoritative records or reports about a device. The authoritative sources include, but are not limited to, a manufacturer or a device certification body, a government-based source, an industry consortium, a mobile network operator, insurance and finance companies, a device repair processor, an asset destruction processor, a private business such as a trade-in program operator, or an individual, and the like.

The report aggregating subsystem 420 of the computer-implemented system 102 is further configured to utilize standards-based device identifiers and industry standards in assessing device identification, including but not limited to those of the GSMA (such as TS 06, RFC 7254), 3GPP/ETSI (TS 123.003) and other data models and data model frameworks, including those used by mobile network OSS/BSS/HLR/EIR systems, law enforcement and CEIR/National EIR and the like, asset management, insurance, and other parties with regard to device 120 reference and identification. The report aggregating subsystem 420 of the computer-implemented system 102 is further configured to permit management of industry standards in assessing device erasure, including but not limited to those of the IEEE (2882-2022), NIST 800-88, DoD 5220.22-M, UK HMG IS5, and the like and industry certifications such as ADISA regarding device erasure and content removal services, on a per-user basis. The report aggregating subsystem 420 of the computer-implemented system 102 is further configured to permit management of industry standards in assessing device condition and evaluation criterion and the accompanying observation language, including those of the SERI and R2 standards, the CTIA, and the GSMA, and others as may apply including those of marketplaces, to ensure and contribute to a uniform and consistent description of the physical/technical/operational/functional/software/cosmetic aspects of a device can be similarly described, on a per-user basis.

The plurality of subsystems 110 further includes the erasure status determining subsystem 422 configured to determine an erasure status of the one or more radio-connected electronic devices 120 indicating successful completion of erasure through at least one of: an industry-standard device erasure software application, and a system interface to implement device erasure. The erasure status determining subsystem 422 is a specialized verification component that accesses, analyzes, assesses, validates and documents the third-party report of complete removal of user data, personal information, and sensitive content from radio-connected electronic devices 120 by evaluating the results of certified data destruction processes to confirm that the radio-connected electronic devices 120 have been properly sanitized and are ready for safe transfer, resale, or disposal without risk of data recovery or privacy violations. The erasure status determining subsystem 422 (dedicated software component that accesses, analyzes, assesses, validates, and documents data wiping operations performed on electronic devices, such as examining erasure completion certificates, verifying data overwrite patterns used meet or exceed standards, and confirming storage sanitization according to established security standards) represents the specialized functionality for data destruction verification.

In an embodiment, the system 102 is further configured to determine one or more source provenance certified data sources and verified credential third party data sources, including potential ranking and ordering of data source preferences depending on multiple factors including level of authority and/or data provenance, industry certifications for reports and data from each source, recentness, and other factors that support a differentiation between parsing or display order of a data source for an identical, related, or similar encumbrance or other report contained in the trust certificate.

The plurality of subsystems 110 further includes the output subsystem 424 that is communicatively connected to the one or more hardware processors 106. The output subsystem 424 is configured to provide and transmit the determined one or more first reports, one or more second reports, and one or more third reports of the one or more radio-connected electronic devices 120 in a trust certificate format to one or more requesting users through one or more user interface methods implemented by one or more communication devices 114 of the one or more requesting user and process and support the user interaction regarding the incremental or refreshed reports.

In another aspect of the present disclosure, the plurality of subsystems 110 further includes a data obtaining subsystem, a device record ingestion subsystem, a device record determination subsystem, a device analysis subsystem, a third party data integration subsystem, a third party system interrogation subsystem, a diagnostic assessment subsystem, an encumbrance assessment subsystem, an identity and credentials management subsystem, a device compatibility request subsystem, a data interrogation scheduling subsystem, a device change management subsystem, and a notification subsystem, using data models and data model frameworks facilitating human- and machine-readable data transport and exchange protocols.

In an exemplary embodiment, the data obtaining subsystem is configured to obtain the device data from a plurality of data sources. The device data obtained from the plurality of data sources may represent digital records containing attributes about the one or more radio-connected electronic devices 120. The attributes, such as identification and origination, include at least one of: a manufacturer's DPP if available, physical/technical/software/operational status, repair information, locks and encumbrances, mobile device crime reports, ownership claims, destruction, device compatibility on a mobile network, and the like.

In an exemplary embodiment, the device data may include information about cellular technologies within a country, other attributes about the devices 120, such as an energy rating, a repairability index, physical features (removable SIMs, number of SIM slots), information about the capabilities of the device 120 (presence of Near Field Communications (NFC) and support of a radio technology such as 4G, 5G Non-Standalone (NSA), 5G Standalone (SA)), and other features and attributes that correspond to the devices 120 belonging to variants within a make/model subset. For instance, all Apple® iPhones® of the A1234 series are configured with one removable Subscriber Identity Module (SIM) and an Embedded Subscriber Identity Module (eSIM) for two supported IMEIs, while another iPhone® A4321, sharing the same iPhone® name and model name (such as iPhone® 15 Pro), may be configured with no removable SIMs but two eSIMs, for two supported IMEIs. Both variants are configured with 5G SA and 5G NSA capabilities in addition to 4G, 3G, and 2G support, yet support slightly different spectrum allocations due to regional ITU-region, country-level differences, or market-level differences.

The data obtaining subsystem further integrates the device data to provide at least one of: information and data-driven insights about the identification of the devices 120, such as at least one of: the manufacturer, make, model, sub-model, model code, and other features and attributes of the devices 120. This also includes the information and the digital records about interactions with the devices 120, such as at least one of: a trade-in transaction, a diagnostics report, an erasure report, a repair report, an ownership claim report, a mobile crime report, a lock report, an encumbrance report, a destruction report, and the like.

Generally, data reports of the devices 120 are stored in form of one of: snapshots and summary tables in the one or more databases 116. The device data requires only periodic refreshing, such as the implementation of a new data source that presents a report about the devices 120, thereby ensuring that the attributes contained in the digital records received from the plurality of data sources are correctly associated with the physical, technical, software, and operational aspects of the devices 120. The information about the devices 120 requires regular refreshing to encapsulate changes in the devices 120, including in the regulatory requirements for the sale in a market, as well as emergence of a new technology/feature/attribute, including the evolution of such features, and the like.

The plurality of data sources may be configured with specific and independent methods of aggregating information about the devices 120, such as abstraction, reduction, and summarization of the device data. Based on the digital records, an interactive verifiable credential-based trust certificate 118 is generated to send the revised and most recent collection of records and the summaries in the verifiable credential-based trust certificate 118 (as shown in FIGS. 2 and 3) to a requesting user of the one or more users, such as a public user, a buyer, a seller, a marketplace, a regulatory body, and the like.

The digital records associated with the devices 120 are configured with certified interactions, comprising at least one of: an indication that the device 120 is examined by a hardware diagnostics tool; an indication that the device 120 is erased by an industry-standard tool to remove prior user data including, but not limited to, at least one of: photos and email; an indication that no mobile device crime report is filed against the device 120; an evaluation of whether the device 120 is operationally compatible with a particular network based on a device compatibility scoring; and an indication of any at least one of: active lock, encumbrance, and ownership claim associated with the device 120. The above-mentioned records pertain to device attributes that are not discernible through physical inspection of the device 120 and collectively represent transaction risk that is not visually apparent in the secondary and circular device market. Additionally, the digital records are configured with risk attributes that accumulate on the device 120 following an initial sale to the user (consumer), and as such, are not present in any known implementation and iteration of the DPP.

In an exemplary embodiment, the device record ingesting subsystem is configured to obtain the device data from the data obtaining subsystem through at least one of: an API, a file transfer, a file upload, and the like, per record or as a batch of records, about the device 120. In this process, the system 102, through the device record ingesting subsystem, acquires a new report about the device 120 and identifies the source of the report and the nature of the report to associate the report appropriately with the device 120 and physical/cosmetic/software/technical aspects, locks, and encumbrances.

In another exemplary embodiment, the system 102 may be updated with a new data source, such as at least one of: a manufacturer registering DPPs with the system 102, the diagnostics application report, the erasure report, the asset repair report, the asset destruction report, a network/governmental body responsible for mobile device crime reports, and the like. As the multitude of sources grows, the method of report ingestion to the system 102 may be regularly updated to ensure that the digital records for the device 120 are securely and correctly transmitted from each source to the system 102. The ingestion of the record is validated in alignment with a data clearinghouse/data warehouse/other similar structures, and application of data models and data model frameworks to support a transparent and auditable trail of record transmission/receipt/acceptance.

In an exemplary embodiment, the system 102 incorporates the digital records from the plurality of data sources using standardized data models, identifiers, and verification structures for transparency and traceability, as is needed in support of Digital Product Passports and product lifecycle reporting. Each data source of the plurality of data sources may provide different types of records (for instance, a processor may provide the diagnostics report and the erasure report) and variations of a report (for instance, user A generates a full array of device attributes in a diagnostics report using Diagnostics system M, while user B, diagnoses only a subset of device attributes in a diagnostics report) also using Diagnostics system M. The device record determination subsystem is configured to associate the digital records corresponding to the device 120 with a predefined topology and type of digital record to ensure that the contents of each digital record are correctly mapped to the device 120.

The device record determination subsystem is further configured to represent the record in terms of the device attributes, including physical, technical, software, cosmetic, lock, encumbrance, the crime report, a destruction report, and similar characteristics. One of: a marketplace and a selling party may seek only specific trust certificate features included in the verifiable credential-based trust certificate 118, with other features being able to be purchased by an interested user (purchaser). To this end, the device record determination subsystem may associate a subset of data sources as applicable to a default trust certificate profile, with one or more additional data sources available but not included in the default trust certificate profile.

The content of the digital record is validated, assessed, and compared to existing and known values for the device 120, including determining if a status change for the device 120 has occurred. Some instances of the status changes may include a replacement of a part, such as a battery, the registration/removal of a lock and encumbrance, and other interventions to the device 120 in terms of physical, technical capabilities and functionality, software capabilities and functionality, disposition and ability to be transacted on by a new user, and the like. The device analysis subsystem receives and analyzes the reports that are ingested by the device record ingestion subsystem and is processed by the device record determination subsystem, to consistently identify and analyze the status changes, and transmit the status changes to the device change management subsystem.

In an exemplary embodiment, the third party data integration subsystem is configured to determine and evaluate the multiple categories of the digital reports about the device 120, and the potential data sources to interrogate. For instance, the mobile device crime reports may include at least one of: a Global System for Mobile Communications Association's (GSMA's) device check service, a national crime report database in country G, and mobile networks in country R via one of: a network's Equipment Identity Register (EIR) and a country's Central Equipment Identity Register (CEIR). When the user requests a refresh of the crime reports in the verifiable credential-based trust certificate 118, the system 102 must identify the available sources for and applicable to the requested refresh. Then the system 102 transmits a request for a refresh to the data interrogation scheduling subsystem. The data interrogation scheduling subsystem then connects via the third-party system interrogation subsystem to each data source to be queried, as per the plurality of data sources indicated by the third party data integration subsystem.

The system 102 is configured to support the selective configuration of status refresh queries, wherein specific data sources may be included or excluded in a verifiable credential trust certificate based on contextual requirements. For instance, a marketplace operating in the United States may configure the system 102 to query only the GSMA's device check service for the mobile device crime reports, whereas a marketplace in the European Union may configure the system 102 to incorporate additional crime report sources. Accordingly, the system 102 is configured to manage trust certificate generation and update processes in accordance with marketplace-specific and seller-specific configurations. This configuration capability enables cost-efficient operation by querying and updating only a subset of data sources, rather than all available sources.

While some digital records may be transmitted to the system 102 via the device record ingestion subsystem, other digital records may be refreshed upon the request. The system 102, via the third party system interrogation subsystem, may transmit the request for the digital record to the data source registered in the third party data integration subsystem, using the data transmission systems and methods, as well as identification credentials stored for the data source. The methods used by the third party system interrogation subsystem may include system architectures adopted in a variety of trusted data model structures and systems. This includes, but not limited to, at least one of: a W3C verifiable credentials data model, one of: distributed, decentralized, and centralized authentication models to ensure that the system 102 is well-formed and validated for user requests for interaction, and the like. The interactions with the system 102 occur in API and HTTP requests, initiated via one of: web browsers (e.g., HTTP GET), HTML form submissions (GET or POST), an application, an application logic such as scanning a QR code and programmatically initiating a request, JavaScript-based applications interacting with backend services through asynchronous HTTP requests (e.g., fetch or XMLHttpRequests), websockets, mainstream TCP/IP and TCP/UDP protocols, and the like. Further, the data may be presented in data structure formats, such as at least one of: JSON, XML, YAML, HTTP requests, and other structured markup languages suitable for data transmission.

Each data source builds and manages the software implementation and the per-client customized report format when recording at least one of: the device diagnostics reports, the digital records/reports configured with several variability in terminology, data attributes measured/diagnosed, and the structure of a report varies depending on the implementation of the third part data source. It is necessary to ensure that the contents of a digital diagnostics record are assessed to ensure that report attributes are mapped correctly to the same physical/technical/software components of the device 120 using standards-based unique device identifiers, irrespective of the structure of the report.

For instance, for diagnostics record source M, the user A may prefer to have 2 tests of wireless charging under a 'Power' node, while the user B may prefer to have 3 tests of wireless charging under a 'Battery' node. Responsible Recycling (R2) standards are extensive in major markets towards adoption of a common set of at least one of: language, terminology, measurements, values, descriptors, and the like, to describe a device's 120 condition. The R2 standards are recognized within the circularity ecosystem as a guiding reference for device processing and reporting and are widely preferred by business and corporate entities to support legal and regulatory compliance; however, adherence to such standards remains voluntary. In view of this, the diagnostic assessment subsystem is configured to accommodate variations in report formats and ensure accurate assessment of the physical, technical, software, operational, and cosmetic characteristics and status of the device 120.

The system 102 incorporates the digital records from multiple lock and encumbrance data sources, and each source presents data differently, and in different languages. The digital records are customized report formats when recording the device reports. Further, there are several types of encumbrances, including, but not limited to, at least one of: device operating system provided features such as Apple's Find My iPhone® (FMiP) for the user to prevent unauthorized utilization and management of the device 120 by another end-user, asset management services such as the GSMA's Device Registry service and similar where owners of the device 120 register an ownership claim on the device

120 (an instance is a company registers company-owned phones that are distributed to employees and the employees should not be able to transact these phones), a mobile network operator who contractually provides the device 120 to the user and imposes a lock on the device 120 until contractual obligations are satisfied, the mobile network operator who registered the encumbrance on the device 120 for unpaid bills and other obligations, the mobile crime report in which the device 120 is registered as stolen property, when a certified device destruction facility have certified destruction of the device 120, when a mobile device management profile or similar is been placed on the device 120 by a device management service or software to prevent changes such as one of: application installation, erasure, and network policy changes, or other encumbrances and registrations to the device 120 from the various entities in a mobile device ecosystem.

The encumbrances associated with the device 120 are highly varied in nature, with many directly impacting the ability of a subsequent user to fully utilize the device's 120 technical functionalities as intended. Such encumbrances may affect the device's 120 capability to operate on a non-designated network, the legal eligibility for use within a specific country and region, and may render the device 120 entirely inoperable, suitable only for parts reclamation. In view of the diverse range of report types and encumbrance categories, the encumbrance assessment subsystem is configured to standardize the identification and classification of locks and encumbrances registered against the device 120. This standardization ensures that marketplace participants are accurately informed of the device's 120 encumbrance status, thereby enabling informed and compliant transaction decisions.

The one or more users across a variety of roles interact with the system 102, ranging from service management, managing service participation by third party data sources providing reports to the system 102, regulatory bodies, marketplaces and selling parties utilizing the verifiable credential-based trust certificates 118 in the online and offline marketplace venues, general public users, to data storage and management services, and the like. The identity and credentials management subsystem provides the core access control management services, ensuring secure and authenticated system interactions, including, but not limited to, at least one of: accessing, reading, updating, and managing data sources. The system 102 provides the ability to access, read, update, write, and manage the digital reports about the devices 120, and do so across a range of data management services (API, file transfer, other data management), such that data transmission services utilized by the system 102 are authorized and correct in scope and permissions for the interaction requested by a user with respect to their role and associated scope and permissions.

The identity and credentials management subsystem ensures that the digital records stored by the system 102 originate exclusively from authorized and certified sources of authority, each of which is verifiably identified and authenticated in accordance with recognized standards of business and corporate identity. In the context of mobile phone transactions, such certified sources include, without limitation, the GSMA, mobile network operators, compliance and conformance certification bodies, operating system entities, device manufacturers, asset management service providers, diagnostics and erasure service providers, repair and refurbishment processing facilities, destruction facilities, law enforcement bodies responsible for mobile device crime reports, and other ecosystem entities critical to evaluating the physical, technical, software, operational, encumbrance etc aspect of the device 120. Each digital record is auditable, and evidentiary in nature, enabling traceable verification of a specific device 120 and the provenance and status within a secure and tamper-evident data warehouse environment.

In an exemplary embodiment, the device compatibility request subsystem is configured to provide a scoring of the technical compatibility in terms of radio alignment with the mobile network operators in a specific country, as well as in multiple countries such as one or more countries in a region (such as the United States and Canada) as well as one or more countries in a non-regionalized set of countries (such as Brazil and Germany). The queries for the device compatibility request subsystem include the IMEIs to represent the device 120 and a selection of at least one of: the regions, the countries, and carriers of interest, with the device compatibility request subsystem returning a time-stamped scoring of the device 120 across the requested selection of countries/carriers.

As the technologies and spectrum employed by the device 120 are unchanging, the same technologies and spectrum employed by a network evolve with new technical standards, spectrum auctions, and operating context. The device compatibility request subsystem and the derived scoring for the device 120 is the digital record about the device's 120 ability to interoperate on a specific network at the point in time of the record snapshot. The device compatibility request subsystem provides transparency about the device's 120 ability to interoperate in the region/country/carrier context as desired by the user of the device.

Further, the interactivity aspect of the system 102 includes the ability of user to one of: request an update and request a combination of regions, countries, and networks via a secure mechanism (a secure QR code or other means of accessing an interactive tool) to incrementally add and refresh the digital record of the device 120. The device compatibility request subsystem further interacts with the data interrogation scheduling subsystem, which ensures that additional requests to the digital records of the device 120 are performed in accordance with the secure and verified data management practices of the system 102.

In an exemplary embodiment, the data interrogation scheduling subsystem is configured to manage the device 120 for one of: the manual and automated refresh of reports from external data sources that may be expected to change over time, or where a refreshed status is required. The digital records may be requested for the device 120 on a manual on-command basis and automated using time and condition-based triggers. The time-based triggers may check for at least one of: mobile crime reports daily, lock and encumbrances weekly or monthly, and device compatibility monthly, and the like. The condition-based triggers may check for a transaction activity, or a change in status of a technical, functional, operational, or other encumbrance or other report about a device.

For instance, the status of the device 120 as an asset presented for transaction in a marketplace context may also serve as a condition-based trigger, such as when the device 120 is added to a shopping cart, wherein subsequent transaction flows are dependent upon a refresh of potential locks and the encumbrances associated with the device 120. In the circularity lifecycle stages, at an early stage around device trade-in, there may be no mobile device crime report filed against the device 120, and the device's 120 other network locks and encumbrances may not be visible. However, after being received at the take-in point, it is necessary for a highly technical inspection and diagnostics session to be conducted at a processing facility, which entails multiple days of transport and processing, thus introducing delay in which the devices 120 are aggregated, for example as a unit of devices, whether a single device or until a box or other unit (e.g., palette) of devices 120 is full and collection is performed, and the devices 120 are transported by one or more of: land, sea, and air to a processing facility.

In the event that the device 120 undergoes repair, such activity is often performed at a processing facility separate from those handling diagnostics and data erasure. As a result, additional transport and processing time is incurred prior to the device 120 becoming available for presentation in a marketplace context. During this interim period, it is possible for a mobile device crime report to be filed against the device 120, thereby impacting the eligibility for subsequent sales and transactions, as the device 120 is officially recorded as stolen property.

Further, if the device 120 is initially purchased on a contract for use, such as a 24-month contract (an example), and the user sold the device 120 after 16 months and makes no further payments, it is often 2 or more billing cycles (usually one billing period lasts one month) to lapse before the device 120 encumbrance is initiated by the carrier to lock the device 120 for unpaid bills. As such, the circularity ecosystem requires frequent re-execution of digital reports about device 120 as the information of device 120 flows between lifecycle stages, and as time elapses, it is possible that a lock, encumbrance, and other reports on the device 120 are registered and/or deregistered.

In an exemplary embodiment, the device change management subsystem is configured to detect changes in the physical, technical, software, operational, and cosmetic attributes of the device 120 by comparing newly received data against previously stored reports. Such changes may include, but not limited to, at least one of: the registration of a new encumbrance and the execution of an intervention, such as battery and screen replacement, that alters the device attributes. Upon detecting the change, the device change management subsystem is further configured to identify the nature of the change, evaluate the severity, and determine an appropriate course of action in response to the detected change. The changes are recorded in the digital records, and notifications to interested parties are independent of the storage and association of the digital records in a data clearing house and the one or more databases 116.

The next steps may include at least one of: a notification of the change, a suppression of notifications of the change, and selection of notification recipients for a type of change. For instance, the marketplace may receive the notifications of the mobile device crime reports, as might the seller, but the marketplace need not be informed that the battery in the device 120 has been replaced. The device change management subsystem identifies, stores, and manages the device 120 profile across multiple categories of lifecycle events and likely changes to be encountered. Further, the device 120 change management subsystem interacts with the notification subsystem if the detected change requires the transmission of the notification about the device 120.

In an exemplary embodiment, it is necessary to ensure that changes in at least one of: the encumbrances and attributes of the device 120 are transmitted to the relevant parties. Such transmissions of change notifications about the device 120 are performed by the notification subsystem. This transmission occurs through, but not limited to, one of: common and standardized electronic messaging systems, including third party and commercial electronic messaging services (email, secure email, certified email, SMS, app-based javascript, web sockets), the API, other similar HTTP, other TCP/IP, TCP/UDP messaging protocols, and the like. The notification subsystem may automatically unsubscribe the one or more users after a pre-defined period of time, such as two months, or an event, such as a sale, and may alternately utilize a third-party service to manage subscription and unsubscription.

Figure 5:
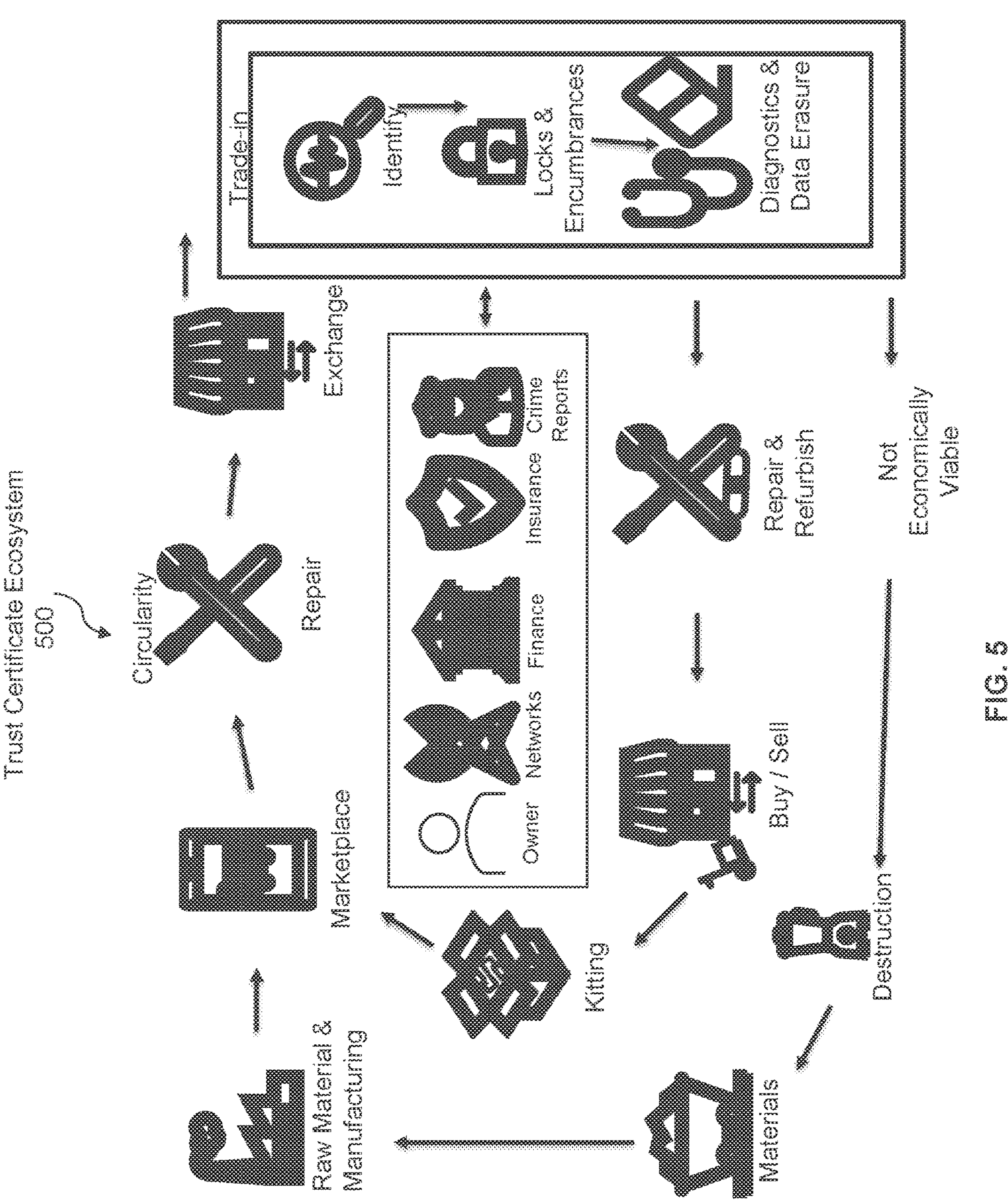
FIG. 5 illustrates an exemplary flow diagram representation depicting the generation of the verifiable credential-based source reports comprising the one or more credential-verified trust certificates for the one or more radio-connected electronic devices, in accordance with an embodiment of the present disclosure, with regard to the greater circularity ecosystem.

FIG. 5 illustrates an exemplary flow diagram representation 500 depicting the generation of the verifiable credential-based source reports comprising the one or more verifiable credential-based trust certificates 118 for the one or more devices 120, in accordance with an embodiment of the present disclosure, with regard to the greater circularity ecosystem. In an exemplary embodiment, the devices 120 are identified with standards-based unique device identifiers defined by the industry standard bodies such as the GSMA and 3GPP/ETSI and GS1. Common device identifiers include the IMEI and Embedded Identity Document (EID) for the radio chipset, and the serial number via each manufacturer/OEM for the overall set of hardware comprising the product. Other standards-based unique identifiers include MAC address, ISO/IEC 15459 identifiers, and the like. However, the IMEI, the EID, and the serial number are frequently well understood and accessible by the circular market to differentiate one device 120 from another within at least one of: same make, model, and sub-model structure (such as for retail stock and inventory management and control, including sales documentation, as well as parts management and product listings).

Additionally, such identifiers are frequently used in data models and data model frameworks for at least one of: insurance purposes, inventory and asset management activities, crime reports of theft and loss, warranty claims, device parts determination for repair, asset destruction, and the like. As a sole global supplier of IMEIs per the 3GPP, the GSMA have set forth device data schema supporting standards-based data model frameworks for device identification which are adopted and managed by telecommunications systems (OSS/BSS/HLR) and networks to standardize device reference and interconnectivity between networks and network service providers for activities such as provisioning, billing, and roaming, and therefore also adopted in the circularity market regarding device identification. Further, such frameworks and standards-based identifiers are similarly used in the telecommunication industries EIR/CEIR for purposes of device registration and fraud/risk mitigation purposes.

Further, standardized device identification and reference forms the backbone of mobile device crime reports for reporting incidents about highly portable and often expensive devices 120. Device identification and reference data are also critical for device fleet management, financing, insurance, and asset protection services to support such valuable and portable mobile assets for the one or more users. In these areas, the IMEI, EID, and serial number are recognized by industry participants as unique device identifiers in data models and data model frameworks for reporting about devices. The circularity flow commences with the sale and distribution of newly manufactured devices 120 to a first user of the one or more users via mainstream marketplaces, including, but not limited to, at least one of: physical and online retail storefronts, mobile network providers, and direct sales from manufacturers and brands. At this stage, artifacts and reports associated with the devices 120 primarily pertain to market certification and regulatory compliance, and increasingly encompass impact assessments relating to raw material sourcing, production, and transportation. Upon conclusion of the initial period of user utilization, the device 120 is placed into circularity through exchange and trade-in, in which used devices 120 are collected from consumers, enterprises, carriers, and retailers through a variety of procedures. These procedures include in-store kiosks, acceptance, and send-in programs for device entry to the trade-in process, purchase, swap, or other exchange of an economic benefit for the used device 120.

Upon receipt and acquisition, and oftentimes as required by law, the devices 120 are subjected to identification and IMEI lock and encumbrance checks, wherein a unique identifier, such as the IMEI, is used to check for the mobile device crime reports to identify the lost/stolen status, consumer-enabled anti-theft protections and owner-enabled anti-theft protections, financial and contractual encumbrances, and other encumbrances and obligations which impact device re-use. Such encumbrances affect the legal transaction eligibility of the device 120 and influence the re-use scenarios. Therefore, this impacts the financial valuation of the device 120 as an asset in a marketplace. These checks are performed by querying third party data services, including the GSMA, mobile network operators (MNOs), law enforcement agencies, hardware manufacturers, and other services for status about a device 120, including device identification, crime reports, financial liens and locks during contract periods, and other device encumbrances. The outputs of these queries are the digital records returned to the querying party by the various data services utilized.

Following verification and identification of the device 120 and the associated encumbrances, the device 120 advances to the diagnostics and data erasure stage. This stage may be performed by the same party that receives the device 120 and checks for encumbrances, such as through the kiosk or at an acquisition facility. The device 120 may be sent to a specialized device processor, as when initial collection is unable to further process the device 120. This stage includes hardware and software diagnostics, and testing to assess technical and functional integrity of the device components (such as the sensors, screen haptics and pixels, buttons, ports, camera, battery, etc.). This may be conducted in one of the following modes: wholly or partially automated and wholly or partially under human interaction.

Further, certified data erasure processes are implemented to comply with data privacy and security standards, via a certified erasure software solution, often while the device 120 is connected for the diagnostics stage. The outputs of these processes are the digital records from the software and systems used by the diagnostics as well as erasure software to interrogate and interact with the device hardware, such as memory and storage chips. At this point, the processor is aware of detected faults with the device 120, and in conjunction with the preceding step, the intermediary owner of the collected, identified, diagnosed, and/or erased device 120 may make an informed business decision to re-sell the device 120, send the device 120 for repair and intervention to return the device 120 to one of: a market-acceptable state, and/or recover materials.

If the device 120 is determined to have no economic value for returning the device 120 to market, the certified destruction of the device 120 and reclamation of materials results in a digital object and record of device destruction from a responsible service operator. However, in the case of a future economic viability to return the device 120 to market, the devices 120 then pass through a chain of intermediary interventions to prepare the physical device and the hardware and software components for sale. Depending on the extent of intervention required, the device 120 may be one or more of: repaired, refurbished, and simply repackaged. Intermediary transactions may encompass stages such as repair, in response to hardware and technical faults identified by diagnostics software, such as faults in the screen, battery, or other physical components. Such repairs may utilize one of: OEM components, OEM-authorized components, and third party materials, in order to restore the device 120 to a physically functional state.

The non-OEM and non-authorized parts may present a technical risk to the device 120, as these may adversely affect resource usage, safety, and performance. These may lack security protocols, may not fully support all subcomponents of the device 120, and may present device testing and/or diagnostics impediments. Additionally, multiple rounds of buy/sell transactions and logistical operations involving the devices 120 in bulk are conducted to progressively transition the devices 120 from the collection point, through initial processing and repair, and across multiple ownership transfers, toward an identified target market. This progression is driven by market-specific demand for the device 120, based on factors such as make, model, characteristics, and other relevant attributes. Oftentimes, devices at this stage lack original items such as documentation, power adapters, and USB cables, and are transacted in bulk packaging. Kitting and packaging for retail readiness, whether for physical or online storefronts, occur in accordance with market norms and the specific requirements of the final target marketplace.

Ultimately, a device's 120 circular flow journey includes 6 or more changes in ownership from the time the device 120 leaves the previous end-user/owner, through the circular lifecycle stages, concluding with the attempt of activation in the country, on the target network by the new end-user who purchased the device 120 for usage as intended from a final marketplace. This multistep pathway is required to return the device 120 into productive re-use, underscoring the operational complexity and data-dependence of the circular economy for the devices 120, and specifically the need for aggregating information throughout the lifecycle stages for data about each device 120 in flow.

In one embodiment, the verifiable credential-based trust certificate 118 includes a digital signature generated using the private key of an issuing authority. The issuing authority is recognized by one of: a registered certificate authority or an on-chain decentralized identifier (DID). The verifiable credential-based trust certificate 118 is validated by one or more mechanisms, including but not limited to: reference to an issuer's public certificate chain (e.g., X.509) and via smart contract execution, verifying hash correspondence on a distributed ledger such as a blockchain network.

The system 102 aggregates and consolidates in the data frameworks in common use, to capture and organize critical data sets that support market information and efficiency of the global circular economy for the devices 120 by reducing systemic risks. The present disclosure improves visibility on the device 120 itself after manufacture and initial sale, improves alignment between the devices 120 and the intended uses, and accurately relates the condition and history of the devices 120, thereby enhancing trust among buyers and sellers, improving transparency in circularity markets regarding the actual asset being transacted. Improvements in such market dynamics enhance legal compliance, contribute to reduced return rates, and increase the efficiency of circular device markets by delivering evidence-based data from trusted, credential-verified data sources. These improvements yield positive environmental outcomes by mitigating uninformed decision-making related to the buying, selling, and shipping of assets across markets, thereby providing a trusted and reliable solution to all stakeholders involved in the circular device flow.

FIG. 6 illustrates an exemplary block diagram 600 depicting the computer-implemented system 102 for automatically managing the one or more digital records and the one or more credential-verified trust certificates 118 of the one or more radio-connected electronic devices 120, in accordance with an embodiment of the present disclosure.

In an exemplary embodiment, the system 102 provides an intelligent, extensible data model and framework for managing and analyzing the digital records related to the devices 120 within a circular economy. The system 102 is initiated through user access/input 602, which includes various methods such as manual input, file uploads, APIs, and certificate refresh triggers, to submit the device data into the system 102. A user management module 604 authenticates, authorizes, and tracks the activities of one or more users interacting with the system 102. The device information repository (synthesized) 606 stores synthesized and processed device data, including identifiers, operational status, and internal logic. The device report repository 616 archives historical and third-party device reports, including repair records, usage history, asset destruction, crime reports, ownership encumbrances, and the like.

Processing of this data is coordinated through a device logic engine 608. The device logic engine 608 determines the query sequences to be executed, identifies the analytics to be applied, and calculates optimal pathways for evaluation. The output is then passed to an analytics engine 610, which reconstitutes the device attributes, analyzes technical characteristics, generates a comprehensive device profile, and computes a device compatibility scoring, a metric vital for circular market viability. Supporting the communication within the system 102 is a notification service 612, which handles messaging and alert dissemination based on real-time status updates and user-defined triggers. A device compatibility service 614 provides a dedicated interface to determine the compatibility of a given device 120 with the spectrum and technology of a specific network. The device compatibility service 614 provides compatibility scoring of the interoperability of device 120 in a country/network combination(s).

An external data engine 618 facilitates integration with third party databases and services, enabling query execution and report acquisition from external sources. On the operational side, business process solutions 620 consolidates multiple enterprise functionalities, including: a) inventory and data catalog management, b) trust certificate management, which handles both data import and interactive product status record (IPSR) and trust certificate export, c) permissions management system to control access and delegation, d) support systems for service management or user assistance, e) third party data interrogation system coordination, ensuring synchronized queries across federated sources, f) queue systems for sequencing and managing process requests, delays and asynchronous operations, and g) billing/payment systems to handle monetization, subscriptions, and service-level access.

The system 102 facilitates the generation, management, and dissemination of the verifiable credential-based trust certificates 118 and compatibility scores for the devices 120.

Figure 7:
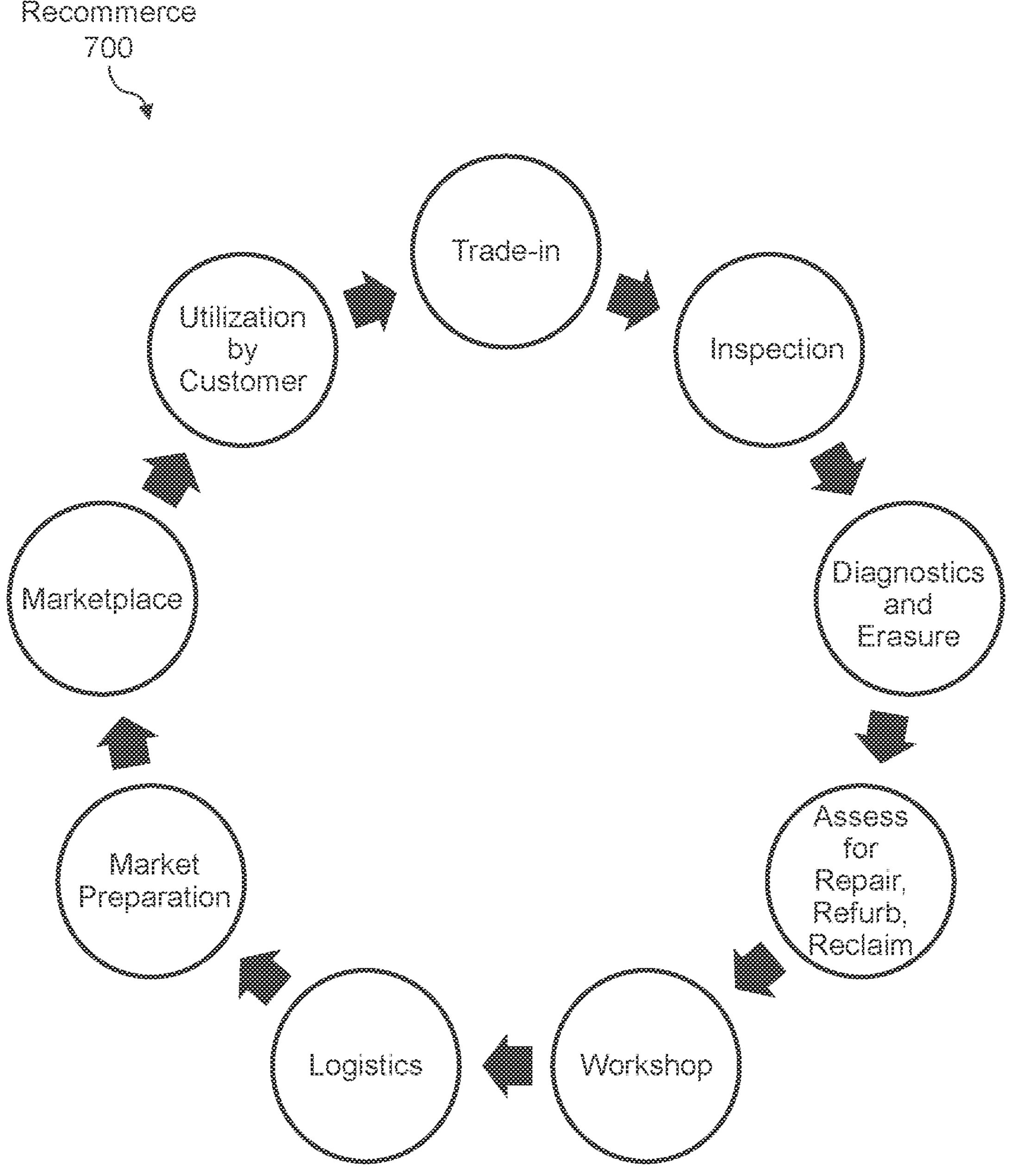
FIG. 7 illustrates an exemplary closed-loop reverse commerce (recommerce) process for the one or more radio-connected electronic devices, in accordance with an embodiment of the present disclosure.

FIG. 7 illustrates an exemplary closed-loop reverse commerce (recommerce) process 700 for the one or more radio-connected electronic devices 120, in accordance with an embodiment of the present disclosure.

In an exemplary embodiment, the closed-loop recommerce process 700 for the devices 120 ensures integrity, traceability, and optimization at each stage. The user initiates the process by submitting the device 120 via trade-in programs (e.g., at carrier stores, online platforms). The device data enters the system 102 for evaluation and resale. Upon collection, the device 120 undergoes preliminary identification and inspection to detect physical condition (scratches, dents, cracks), presence of accessories, power-on tests, and the like, and often checks for mobile device crime reports. This stage flags the devices 120 for further one of: diagnostics or recycling. The system 102 receives diagnostics (battery health, display function, radio test, etc.) reports and certified data erasure (in compliance with standards) reports to ensure privacy. Based on diagnostic results, the device 120 is routed for: repair (hardware faults), refurbishment (cosmetic fixes), and parts reclaim (if irreparable or Beyond Economic Repair).

A workshop executes the repair/refurbishment actions using one of: the OEM or the third party parts, and functional upgrades (such as battery/screen replacement). This prepares the device 120 for reuse. The devices 120 move to logistics hubs for inventory tracking, packaging, and re-routing to final destinations and staging for marketplaces. The devices 120 are cleaned, labelled, graded (A/B/C quality, etc depending on the marketplace), and packaged, with OEM or non-original accessories, according to resale standards (e.g., open-box or certified refurbished). Devices may be bought/sold multiple times and shipped internationally before they are presented in a consumer-facing marketplace. The devices 120, when ready for re-sale, are listed on various channels (eCommerce, retail stores, Business to Business (B2B) platforms). Integration with trust certificate systems ensures the buyer receives available verified product data about the device 120. Once purchased, the device 120 is used by the user, who may later reinitiate the cycle via trade-in, thus further promoting device circularity.

Figure 8A:
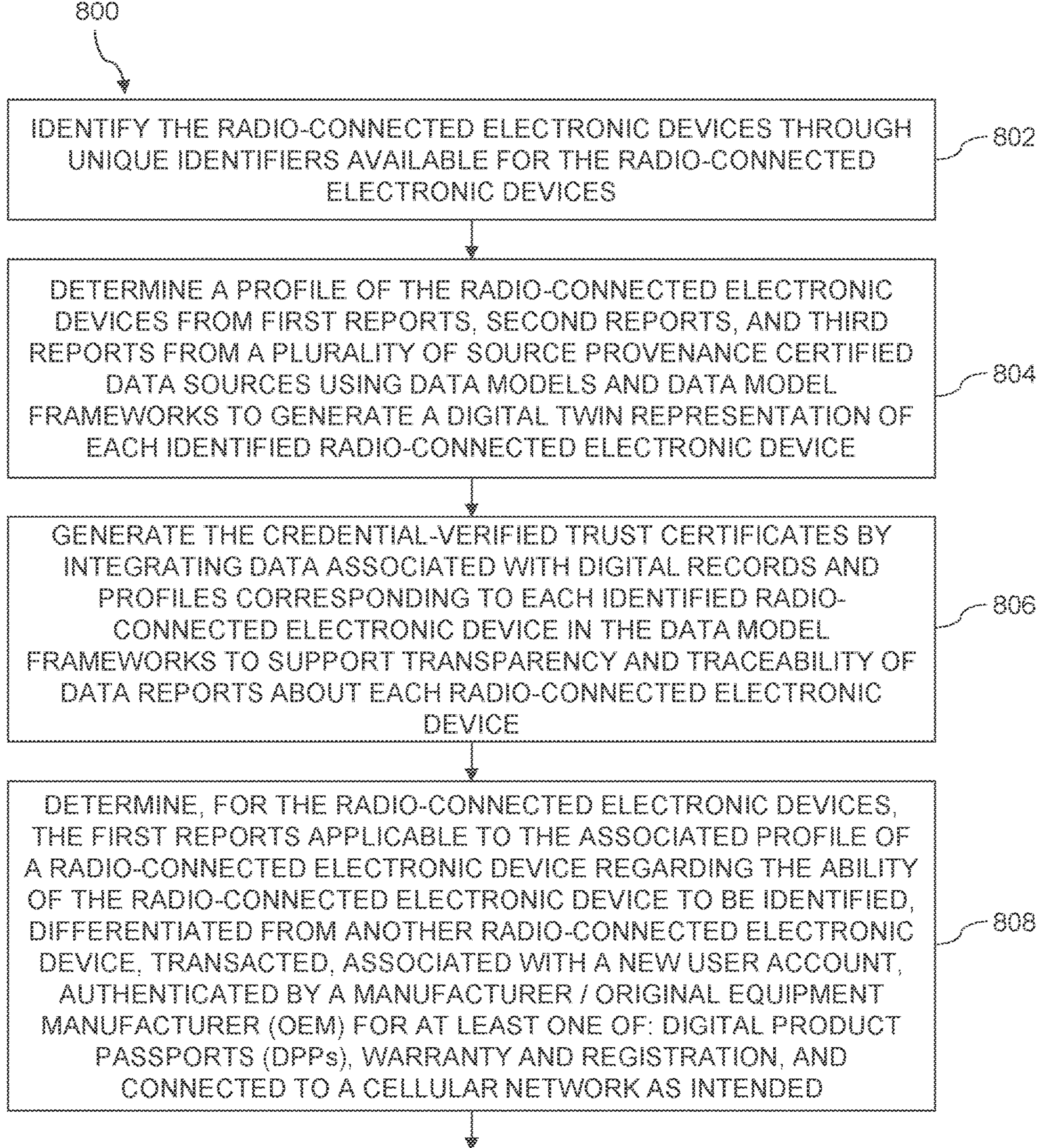

FIG. 8A-8C is a flow diagram illustrating a computer-implemented method 800 for automatically managing the one or more digital records and the one or more credential-verified trust certificates 118 of the one or more radio-connected electronic devices 120, in accordance with an embodiment of the present disclosure.

At step 802, the one or more radio-connected electronic devices 120 are identified through the one or more unique identifiers available for the one or more radio-connected electronic devices 120. In an embodiment, the one or more unique identifiers are standards-based unique device identifiers comprising at least one of: International Mobile Equipment Identity (IMEI), Embedded Identity Document (EID), and serial number, and wherein the one or more unique identifiers indicate device data attributes comprising at least one of: visible attributes comprising make and model information, non-visible attributes, and non-disclosed attributes comprising modem radio configuration and capabilities. At step 804, the profile of the one or more radio-connected electronic devices 120 is determined from one or more first reports, one or more second reports, and one or more third reports from a plurality of source provenance certified data sources using data models and data model frameworks to generate a digital twin representation of each identified radio-connected electronic device of the one or more radio-connected electronic devices 120. At step 806, the one or more credential-verified trust certificates 118 are generated by integrating the data associated with the one or more digital records and profiles corresponding to each identified radio-connected electronic device 120.

At step 808, the one or more first reports applicable to the associated profile of the radio-connected electronic device 120, are determined regarding the ability of the radio-connected electronic device 120 to be identified, differentiated from another radio-connected electronic device, transacted, associated with the new user account, authenticated by a manufacturer/OEM for at least one of: DPPs, warranty and registration, and connected to a cellular network as intended. At step 810, the one or more second reports applicable to the one or more radio-connected electronic devices 120 and associated profile of the radio-connected electronic device 120 are determined regarding the one or more reports about functional, technical, operational, physical, and cosmetic states, condition, status, and capabilities of the radio-connected electronic device 120 in terms of the ability to use a radio-connected electronic device as intended by the new user. At step 812, the one or more third reports applicable to certified end-of-life processing, comprising secure erasure, physical destruction, and material recovery of the one or more radio-connected electronic devices 120, are determined. At step 814, the owner-imposed anti-theft locks and encumbrances are determined to prevent unauthorized transaction and re-use of the radio-connected electronic device by another end-user as the one or more first reports based on at least one of: a device manufacturer, an owner, and asset management user of the one or more radio-connected electronic devices 120, impacting the ability to be acquired by and subsequently utilized by the new owner without the reduction in operational capabilities.

At step 816, the network-imposed device locks and encumbrances are determined, which indicate that the radio-connected electronic device 120 is locked, due to at least one of: claim of contract disputes, purchase obligations, unpaid service fees, and unsatisfied obligation in which the prior owner's mobile network has locked the radio-connected electronic device 120 to or from the network associated with the radio-connected electronic device 120. At step 818, the one or more compatibility scores of the one or more radio-connected electronic devices 120 with an intended operational locality are determined through use of the device for at least one of: a country and a mobile network operator in a country. The one or more compatibility scores are determined through input from at least one of: the user profile, and the recognized user for compatibility scoring of the one or more radio-connected electronic devices 120 for at least one of: a country and a network not already contained in a compatibility scoring report for the radio-connected electronic device 120. At step 820, the one or more first reports, the one or more second reports, and the one or more third reports to the one or more radio-connected electronic devices 120, indicating the ability of the one or more radio-connected electronic devices 120 to be identified, differentiated, transacted, and operated as intended by the new user, are accessed, analyzed, and associated. At step 822, one or more certifications and credentials of the plurality of source provenance certified data sources and the verified identity data sources, are determined. The one or more certifications and credentials provide transparency and traceability of the authority issuing the one or more first reports applicable to device identification and entitlement, the one or more second reports applicable to the functional, technical, and cosmetic status and condition, and the one or more third reports applicable to the certified device destruction through a certified device destruction facility, with regard to the one or more radio-connected electronic devices 120. At step 824, the determined one or more first reports, one or more second reports, and one or more third reports of the one or more radio-connected electronic devices 120 in the trust certificate format, are provided to the one or more requesting users through the one or more user interface methods implemented by the one or more communication devices 114 of the one or more requesting users and process and support the user interaction regarding the incremental or refreshed reports. FIG. 8A-8C, the circular symbols with "A and B" written inside are being used as off-page connectors. These are used for indicating that FIG. 8A continues in the subsequent pages as FIG. 8B-8C.

Numerous advantages of the present disclosure may be apparent from the discussion above. In accordance with the present disclosure, the system 102 for generating the verifiable credential-based trust certificates 118 for the devices 120 is disclosed. The system 102 aggregates multiple data points for a specific device based on the unique identifier, including device identification, network compatibility, locks and encumbrances, repair interventions, mobile device crime reports, device destruction reports, device ownership claims, device anti-theft and property protection activation, lost/stolen status, and the like. The system 102 allows on-demand updates to communicate changes in the device status. The system 102 evaluates and associates potential network intent (i.e., target carrier/country). The system 102 provides quantitative and/or qualitative compatibility scores, visual indicators, and the like to convey device compatibility results. The system 102 provides a shared clearinghouse repository for circularity ecosystem participants, including, but not limited to, at least one of: data aggregators, manufacturers, sellers, buyers, circularity or buy-back program operators, processors, or other circularity flow lifecycle stage participants, to share and store device reports for a particular device 120. The system 102 alerts stakeholders about the device status at one of: pre-trade-in, pre-sale, pre-ship, and post-ship stages. The system 102 reduces environmental impact by minimizing inefficiencies in the secondary/circularity device flow and logistics, as well as the market arising from mismatched device to market placement. The reports support a device's technical and legal capability to be utilized as intended and also contribute to reducing the risk of device fraud from IMEI tampering.

Such reports support the determination of whether the combination of device hardware, radio hardware, and radio configuration collectively satisfies the advertised capability of the device to physically, technically and electronically connect to and consume network resources as intended. Furthermore, such reports may indicate a level of compatibility that informs the one or more users regarding the suitability of the device 120 for use across the intended countries and network combinations. The inherent characteristics of the circular economy results in scenarios where the device 120 is likely to be re-marketed in a different country, region, or continent than originally intended at the time of production, and as such, the inclusion of radio capabilities within the trust certificate as a proxy for a DPP or digital twin, combined with compatibility scoring, is important to the circular economy. As a consequence, any initial OEM-provided compatibility data may become effectively outdated and unusable for determining the device's current operational suitability in a different market context. Even for the device in a market originally identified as the target market, radio compatibility changes as new radio spectrum and radio technology are identified, approved, auctioned, licensed, and deployed by countries and the networks in them, and this is not visible or available from visual inspection of the device to end consumers and retail operators even with highly specialized knowledge.

Further, the advantages and features of the present disclosure deliver meaningful economic and environmental benefits throughout a device lifecycle, extending the potential longevity of the device's use by enabling additional ownership events to occur. The utilization of standardized data models and data model frameworks, identifiers, and verification structures encourage transparency and traceability in both supply chain as well as product lifecycle reporting. Also, this reduces the economic and environmental costs of inefficiencies in the logistics and sales repackaging involved in moving assets from market to market, reduces the number of steps between the device being introduced to the circularity market before the device 120 is next utilized by a new owner, and improves consumer trust in secondary markets by improving transparency about the assets in consideration. The system 102 may be a device identification system for the devices, which creates a verified credential validated DPP, including the devices already in the market and/or where the brand owner/manufacturing party may not create such data about the attributes of the device. The system 102 may be an analysis tool in non-consumer (such as B2B) marketplaces for the devices, which creates an auditable inventory, including the inventory's physical/technical/cosmetic/software status, benefitting the buyers and the sellers in improving transparency and standardization in the status of devices being transacted upon. Further, the system 102 may be an analysis tool for regulatory bodies, telecommunications networks, and the like regarding counterfeit device identification, spoofed IMEIs and other device fraud associated risks. The system 102 may be a sales tool in consumer (such as Business-to-Consumer (B2C)) marketplaces for the devices, which creates an auditable catalog of the digital records about the device, including the device status, repairs or other interventions, device compatibility, ownership claims, crime reports, locks and encumbrances, and the like, benefitting the one or more users by an updatable status of the device being transacted upon.

The system 102 may function as a sales support tool for a marketplace, wherein a user evaluating a device 120 may interact with the verifiable credential-based trust certificate by initiating a request through an interactive mechanism/data carrier (e.g. QR code, etc) embedded within the verifiable credential-based trust certificate. This interaction may include at least one of: requesting updated reports and requesting a device compatibility score by selecting a specific country and/or carrier, thereby enabling dynamic and context-specific evaluation of the device through the interactive components of the verifiable credential-based trust certificate. The system 102 may utilize a verifiable credential framework, mechanism, standard, or other trust architecture, including, but not limited to, at least one of: traditional Public Key Infrastructure (PKI) implementations, such as those employing privately signed digital signatures, Certificate Authorities (CAs), and standards including X.509 and compatible protocols; as well as decentralized frameworks such as W3C VC, the DID, and blockchain-based ecosystems including, but not limited to, Ethereum, Hyperledger, and associated smart contract architectures, such as those deployed within permissioned blockchains, public blockchains, or through other smart contract logic implementations.

The system 102 may support certificate transparency and security through mechanisms including, but not limited to, cryptographically verifiable logs, auditing of such logs, and validation of credentials of parties contributing data to the verifiable credential-based trust certificate. This may include, but not be limited to, verification of digital signatures associated with Certificate Authorities' (CAs) public keys, validation of the certificate chain, and confirmation that certificates have not expired or been revoked, such as by utilizing the Online Certificate Status Protocol (OCSP) and Certificate Revocation Lists (CRLs).

The verifiable credential-based trust certificate 118 is generated in either/both a centralized format compliant with the X.509 standard and/or a decentralized verifiable credential format. The audience/recipient system is configured to select a validation process based on one of: system capabilities and audience context. The system 102 may utilize standards-based device identifiers and industry standards in assessing and associating device identification in reports, including the GSMA (such as TS 06, RFC 7254), 3GPP/ETSI (TS 123.003), and other data models and data model frameworks used by mobile networks Operations Support System (OSS)/Business Support System (BSS)/HLR/EIR, law enforcement, CEIR/National or other multi-country EIR, asset management, insurance, and other parties to ensure and facilitate asset identification and reference. The system 102 may utilize industry standards in assessing and associating device erasure in reports, including Institute of Electrical and Electronics Engineers Standard (IEEE) (2882-2022), National Institute of Standards and Technology (NIST) 800-88, Department of Defense (DoD) 5220.22-M, United Kingdom Her Majesty's Government Information Security Standard No. 5 (UK HMG IS5), and the like, and industry certifications such as Asset Disposal and Information Security Alliance (ADISA) regarding device erasure and content removal services. The system 102 may utilize industry standards in assessing and associating report data about device condition assessments, evaluation criteria, and the corresponding observation language, including, but not limited to, standards established by Sustainable Electronics Recycling International (SERI) and the R2 standard, the Cellular Telecommunications and Internet Association (CTIA), and the GSMA, as well as applicable marketplace-specific standards. These standards contribute to ensuring a uniform and consistent description of the physical, technical, operational, functional, software, and cosmetic aspects of the device, thereby enabling standardized evaluation and reporting across the circularity lifecycle.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing", and "including", and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented system for automatically managing one or more digital records and one or more credential-verified trust certificates of one or more radio-connected electronic devices, the computer-implemented system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a device identifying subsystem configured to identify the one or more radio-connected electronic devices through one or more unique identifiers available for the one or more radio-connected electronic devices, wherein the one or more unique identifiers are standards-based device identifiers comprising at least one of: International Mobile Equipment Identity (IMEI), Embedded Identity Document (EID), and serial number, and wherein the one or more unique identifiers indicate device data attributes comprising at least one of: visible attributes comprising make, model, cosmetic, functional and technical conditions, non-visible attributes, and non-disclosed attributes comprising modem radio configuration and capabilities;

a profile determining subsystem configured to determine a profile of the one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices;

a trust certificate generating subsystem configured to generate the one or more credential-verified trust certificates by integrating data associated with the one or more digital records and profiles corresponding to each identified radio-connected electronic device in the data model frameworks to support transparency and traceability of data reports about each radio-connected electronic device;

a report determining subsystem configured to:

determine, for the one or more radio-connected electronic devices, the one or more first reports applicable to an associated profile of a radio-connected electronic device regarding the ability of the radio-connected electronic device radio-connected electronic device to be identified, differentiated from another radio-connected electronic device, transacted, associated with a new user account, authenticated by an Original Equipment Manufacturer (OEM) for at least one of: Digital Product Passports (DPPs), warranty and registration, and connected to a cellular network as intended;

determine, for the one or more radio-connected electronic devices, the one or more second reports applicable to the associated profile of the radio-connected electronic device regarding one or more reports about functional, technical, operational, physical, and cosmetic states, condition, status, and capabilities of the radio-connected electronic device in terms of the ability to use the radio-connected electronic device as intended by a new user; and determine the one or more third reports applicable to certified end-of-life processing, comprising secure erasure, physical destruction, and material recovery of the one or more radio-connected electronic devices;

an encumbrance determining subsystem configured to:

determine owner-imposed anti-theft locks and encumbrances to prevent unauthorized transaction and re-use of the radio-connected electronic device by another end-user as the one or more first reports based on at least one of: a device manufacturer, an owner, and asset management user of the one or more radio-connected electronic devices, impacting the ability to be acquired by and subsequently utilized by a new owner without a reduction in operational capabilities;

determine network-imposed device locks and encumbrances indicating that the radio-connected electronic device is locked, due to at least one of: claim of contract disputes, purchase obligations, unpaid service fees, and unsatisfied obligation in which prior owner's mobile network has locked the radio-connected electronic device to or from a network associated with the radio-connected electronic device;

a score determining subsystem configured to determine one or more compatibility scores of the one or more radio-connected electronic devices with an intended operational locality through use of a device compatibility service for at least one of: a country and a mobile network operator in a country, wherein the one or more compatibility scores are determined through input from at least one of: a user profile, and a recognized user for compatibility scoring of the one or more radio-connected electronic devices for at least one of: a country and a network not already contained in a compatibility scoring report for the radio-connected electronic device;

a status report determining subsystem configured to access, analyze and associate the one or more first reports, the one or more second reports, and the one or more third reports to the one or more radio-connected electronic devices, indicating the ability of the one or more radio-connected electronic devices to be identified, differentiated, transacted, and operated as intended by the new user;

the report determining subsystem configured to determine one or more certifications and credentials of the plurality of source provenance certified data sources and verified identity data sources, providing the one or more first reports applicable to device identification and entitlement, the one or more second reports applicable to the functional, technical, and cosmetic status and condition, and the one or more third reports applicable to the certified device destruction through a certified device destruction facility, with regard to the one or more radio-connected electronic devices; and an output subsystem configured to provide and transmit the determined one or more first reports, one or more second reports, and one or more third reports of the one or more radio-connected electronic devices in a trust certificate format to one or more requesting users through one or more user interface methods implemented by one or more communication devices of the one or more requesting users.

2. The computer-implemented system of claim 1, further comprising a report aggregating subsystem configured to:

aggregate at least one of: the one or more first reports, the one or more second reports, and the one or more third reports, along with encumbrance reports, crime reports, network compatibility assessments, diagnostic reports, repair history and parts replacement records, associated with the one or more radio-connected electronic devices;

analyze, normalize, and rank reports about the one or more radio-connected electronic devices to represent the physical, technical, cosmetic and capabilities of the radio-connected electronic device in shared and common terminology accounting for differences in report language among data sources about same device aspect;

export the one or more credential-verified trust certificates to an identity of an issuing authority, for validating the one or more credential-verified trust certificates by a recipient system through a cryptographic verification process supporting centralized and decentralized modes of operation; and store the one or more digital records in the one or more credential-verified trust certificates, wherein the one or more digital records comprise at least one of:

information from one or more verified identity data sources, comprising at least one of: a representation of the information, a report generating party, a unique report identifier, and a cryptographic signature;

one or more authoritative records, from one or more verified identity data sources, summarizing the one or more radio-connected electronic devices through at least one of: the one or more unique identifiers, device manufacturer, brand, product model name, model codes, color, and identification of the device data attributes, associated with the one or more radio-connected electronic devices; and the one or more authoritative records, from the plurality of source provenance certified data sources and the verified identity data sources, summarizing and aggregating data models, identifiers, verification structures and digital record and report content comprising at least one of: an internal synthesized device data repository, an internal source of electronic device DPP, an external source of electronic device DPP, device conformity and certification records, manufacturer contributed data, mobile network contributed data, and third party data comprising at least one of: hardware diagnostics report data, erasure report data, crime report data, owner-managed anti-theft locks and encumbrances, mobile network managed locks and encumbrances, financial encumbrances, repair reports, refurbishment and hardware replacement reports, intervention reports, and destruction reports from one or more processors across one or more lifecycle stages of the one or more radio-connected electronic devices.

3. The computer-implemented system of claim 2, wherein in exporting the one or more credential-verified trust certificates to the identity of the issuing authority, the report aggregating subsystem is further configured to:

utilize a verifiable credential framework from at least one of: traditional public key infrastructure (PKI) using privately signed digital signatures, certificate authorities (CA), X.509 standards, compatible standards, decentralized W3C verifiable credentials (VC), decentralized identifiers (DID), Ethereum smart contracts, Hyperledger smart contracts, permissioned blockchain, blockchain, and smart contract logic; and support certificate transparency and security through cryptographically verifiable logs, auditing of the cryptographically verifiable logs, and validating credentials of the one or more users contributing the reports to the one or more credential-verified trust certificates, wherein validating the credentials of the one or more users comprises verifying digital signature of public key of a certificate authority, validating a certificate chain, and determining whether certificates have not expired using online certificate status protocol (OCSP) and certificate revocation lists (CRLs).

4. The computer-implemented system of claim 3, wherein the one or more credential-verified trust certificates are generated in at least one of: a centralized and a decentralized verifiable credential framework and format, and wherein the recipient system is able to validate the one or more credential-verified trust certificates using at least one of:

access by one or more users of the one or more credential-verified trust certificates through a secure data mechanism comprising use of an application programming interface (API) and hypertext transfer protocol (HTTP) request as represented by a certificate code, a secure QR code, a hypertext link, radio frequency identification (RFID) chip, API, one or more machine interoperable methods to provide access to the one or more credential-verified trust certificates, through at least one of: a computer-based application, website, utilization of public-facing access method, machine-readable mechanism, and a scannable method;

interaction by a user of the one or more credential-verified trust certificates, to at least one of: request, order, commission, and procure generation of the one or more digital records for incorporating the one or more digital records in the one or more credential-verified trust certificates and to request for updating current status of the one or more digital records currently stored in the one or more credential-verified trust certificates;

facilitate the user interaction to request the one or more qualitative and quantitative compatibility scores for one or more countries and one or more mobile network operators not already contained and refresh existing networks contained in the one or more credential-verified trust certificates, as a digital record related to the one or more radio-connected electronic devices;

allow user access to detailed representations of a verifiable digital record contained in a credential-verified trust certificate about a radio-connected electronic device, where such representations are available and sharing permissions support disclosure to a recipient of the verifiable digital record, wherein the verifiable digital record comprise at least one of: one or more of a device status check, a diagnostics report, an erasure report and reports of hardware and software systems and subsystems, overall technical capabilities, and an encumbrance report, indicating detailed data points comprising date of a report, system queried, an intent of the report, specific outcomes and sub-outcomes of the report, accompanying detailed content of the verifiable digital record;

process the user interaction to request notifications on the one or more credential-verified trust certificates of the one or more radio-connected electronic devices, in which a change to at least one of: physical and software device status points, technical status of a hardware component, an operational encumbrance, is detected to update the one or more credential-verified trust certificates, wherein the notifications utilize one or more formats comprising at least one of: electronic mail (Email), secure Email, certified Email, short message sent (SMS), electronic messaging, and API services, to request that an identity of the recipient is configured to receive a notification of the change and to provide an access method to the change and revised one or more credential-verified trust certificates; and manage recipient interaction to request cessation of notifications on the one or more credential-verified trust certificates by performing at least one of: pause, stop, set to be paused, and set to be stopped, on the changes to one or more device attributes, after a pre-determined period of time.

5. The computer-implemented system of claim 1, wherein in determining the profile of the radio-connected electronic device, the profile determining subsystem is configured to:

obtain the one or more digital records from the plurality of source provenance certified data sources using data models, identifiers, verification structures and digital record and report content, comprising at least one of: an internal synthesized device data repository, an internal source of electronic device DPP, an external source of electronic device DPP, device conformity and certification records, manufacturer-contributed data, mobile network-contributed data, hardware diagnostics report data, erasure report data, crime report data, owner-managed anti-theft encumbrances, network-managed encumbrances, financial encumbrances, repair reports, refurbishment and hardware replacement reports, intervention reports, and destruction reports from one or more processors across one or more lifecycle stages of the one or more radio-connected electronic devices;

validate authenticity and credentials of each source provenance certified data source by verifying digital signatures, certificate chains, and determining whether certificates have not expired;

normalize the one or more digital records received from the plurality of source provenance certified data sources to accommodate variations in data formats, terminology, and structure while maintaining data integrity in describing at least one of: an aspect, component and capability of the radio-connected electronic device;

map the one or more digital records to a corresponding identified radio-connected electronic device using the one or more unique identifiers comprising at least one of: the IMEI, the EID, and the serial number;

categorize the one or more digital records by record type, data source origin, and lifecycle stage to organize information systematically;

associate subsets of the one or more digital records with default trust certificate profiles while maintaining additional digital records available for unabridged certificate inclusion;

aggregate the one or more digital records from the plurality of source provenance certified data sources for each identified radio-connected electronic device to determine device profile;

rectify conflicts between the one or more digital records from the plurality of source provenance certified data sources by applying a hierarchy and ranking system and methodology based on factors comprising at least one of: source authority, data provenance, industry certifications, and recentness; and update the profile of the one or more radio-connected electronic devices when at least one of: new information becomes available from the plurality of source provenance certified data sources, and existing records are modified.

6. The computer-implemented system of claim 1, wherein in generating the one or more credential-verified trust certificates, the trust certificate generating subsystem is configured to:

retrieve a profile of one or more digital records corresponding to each identified radio-connected electronic device from the profile determining subsystem;

analyze the retrieved profile of one or more digital records corresponding to each identified radio-connected electronic device to identify completeness and quality of data available for trust certificate generation;

select corresponding digital records from the retrieved profile corresponding to each identified radio-connected electronic device based on data models, trust certificate requirements, user preferences, and marketplace specifications;

integrate the selected digital records by combining information about device identification and provenance, physical status, technical status, operational status and associated faults, cosmetic condition, hardware repair and refurbishment interventions, destruction status, indication of utilization of non-OEM parts, status of operational encumbrances and locks and asset management and protection services, and device compatibility scoring;

apply cryptographic processes to secure the integrated data, comprising generation of digital signatures and hash values for data integrity verification;

bind the integrated data to an identity of the issuing authority using cryptographic methods to establish trust and authenticity;

embed metadata into the one or more credential-verified trust certificates comprising certificate identifier, issuer information, issuance timestamp, expiration date, and validation mechanisms;

generate centralized format trust certificates compliant with traditional Public Key Infrastructure and decentralized format trust certificates compatible with blockchain and distributed ledger technologies;

store the generated one or more credential-verified trust certificates in a secure repository with corresponding access controls and audit logging;

create unique access mechanisms for each trust certificate comprising certificate codes, secure QR codes, hypertext links, RFID chip associations, and API endpoints for certificate retrieval;

establish validation pathways for recipients to verify an authenticity and integrity of the one or more credential-verified trust certificates through cryptographic verification processes; and maintain version control of the one or more credential-verified trust certificates to track updates and modifications while preserving historical certificate states for audit purposes.

7. The computer-implemented system of claim 1, wherein in determining the one or more compatibility scores of the one or more radio-connected electronic devices, the score determining subsystem is further configured to:

receive requests for compatibility scoring of the one or more radio-connected electronic devices with an intended operational locality, wherein the requests specify at least one of: a country, and a mobile network operator in a country;

obtain device technical specifications from the device identifying subsystem, wherein the device technical specifications comprise radio and frequency capabilities, supported network technologies, frequency bands, modem and antenna configurations, in supporting communication using second-generation GSM (2G), third-generation UMTS (3G), fourth-generation LTE (4G), fifth-generation NR (5G) Non-Standalone (NSA), and NR 5G Standalone (SA) network technologies and emerging technologies;

retrieve network operator specifications for the specified one or more countries and one or more mobile network operators, wherein the network operator specifications comprise frequency bands, network technologies, spectrum assignments, and technical requirements deployed, licensed, and authorized for use for network implementation;

access trust certificate user profile information when available, wherein the user profile information comprises default selection data for preferred countries and network operators;

provide interactive mechanisms for one or more users to request additional compatibility assessments for country and mobile network operator combinations not previously evaluated, resulting in incremental updates to device compatibility scoring reports;

process input from a recognized user for incrementally adding utilization context about the one or more radio-connected electronic devices, wherein the utilization context comprises an intended country and one or more networks in a country for inclusion in a digital report;

perform technical compatibility analysis by comparing the device technical specifications against the network operator specifications to determine radio frequency alignment, network technology compatibility, and spectrum band support;

determine quantitative compatibility scores based on technical alignment metrics, wherein the quantitative compatibility scores represent percentage compatibility;

generate qualitative compatibility assessments based on operational suitability, wherein the qualitative compatibility assessments comprise compatibility ratings;

generate time-stamped device compatibility scoring reports that document compatibility analysis results, methodology used, internal data sources, and validity period of the qualitative compatibility assessments;

store the device compatibility scoring reports as digital records associated with the corresponding radio-connected electronic device for future reference and trust certificate inclusion; and update the one or more compatibility scores when the network operator specifications change, new spectrum assignments occur, and device technical specifications are modified.

8. The computer-implemented system of claim 1, further comprising an erasure status determining subsystem configured to determine erasure status of the one or more radio-connected electronic devices indicating successful completion of erasure through at least one of: an industry-standard device erasure software application, and a system interface to implement device erasure.

9. A computer-implemented method for automatically managing one or more digital records and one or more credential-verified trust certificates of one or more radio-connected electronic devices, the computer-implemented method comprising, by the one or more hardware processors:

identifying the one or more radio-connected electronic devices through one or more unique identifiers available for the one or more radio-connected electronic devices, wherein the one or more unique identifiers are standards-based device identifiers comprising at least one of: International Mobile Equipment Identity (IMEI), Embedded Identity Document (EID), and serial number, and wherein the one or more unique identifiers indicate device data attributes comprising at least one of: visible attributes comprising make, model information, physical, functional, technical, and cosmetic attributes, non-visible attributes, and non-disclosed attributes comprising modem radio configuration and capabilities;

determining a profile of the one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices;

generating the one or more credential-verified trust certificates by integrating data associated with the one or more digital records and profiles corresponding to each identified radio-connected electronic device in the data model frameworks to support transparency and traceability of data reports about each radio-connected electronic device;

determining, for the one or more radio-connected electronic devices, the one or more first reports applicable to an associated profile of a radio-connected electronic device regarding the ability of the radio-connected electronic device to be identified, differentiated from another radio-connected electronic device, transacted, associated with a new user account, authenticated by an Original Equipment Manufacturer (OEM) for at least one of: Digital Product Passports (DPPs), warranty and registration, and connected to a cellular network as intended;

determining, for the one or more radio-connected electronic devices, the one or more second reports applicable to the associated profile of the radio-connected electronic device regarding one or more reports about functional, technical, operational, physical, and cosmetic states, condition, status, and capabilities of the radio-connected electronic device in terms of the ability to safely and effectively use the radio-connected electronic device as intended by a new user;

determining, for the one or more radio-connected electronic devices, the one or more third reports applicable to certified end-of-life processing, comprising secure erasure, physical destruction, and material recovery of the one or more radio-connected electronic devices;

determining owner-imposed anti-theft locks and encumbrances to prevent unauthorized transaction and re-use of the radio-connected electronic device by another end-user as the one or more first reports based on at least one of: a device manufacturer, an owner, and asset management user of the one or more radio-connected electronic devices, impacting the ability to be acquired by and subsequently utilized by a new owner without a reduction in operational capabilities;

determining network-imposed device locks and encumbrances indicating that the radio-connected electronic device is locked due to at least one of: claim of contract disputes, purchase obligations, unpaid service fees, and unsatisfied obligation in which prior owner's mobile network has locked the radio-connected electronic device to or from a network associated with the radio-connected electronic device;

determining one or more compatibility scores of the one or more radio-connected electronic devices with an intended operational locality through use of a device compatibility service for at least one of: a country and a mobile network operator in a country, wherein the one or more compatibility scores are determined through input from at least one of a user profile and a recognized user for compatibility scoring of the one or more radio-connected electronic devices for at least one of: a country and a network not already contained in a compatibility scoring report for the radio-connected electronic device;

accessing, analyzing, and associating, the one or more first reports, the one or more second reports, and the one or more third reports to the one or more radio-connected electronic devices, indicating the ability of the one or more radio-connected electronic devices to be identified, differentiated, transacted, and operated as intended by the new user;

determining one or more certifications and credentials of the plurality of source provenance certified data sources and verified identity data sources providing the one or more first reports applicable to device identification and entitlement, the one or m ore second reports applicable to the functional, technical, and cosmetic status and condition, and the one or more third reports applicable to certified device destruction through a certified device destruction facility, with regard to the one or more radio-connected electronic devices; and providing and transmitting the determined one or more first reports, one or more second reports, and one or more third reports of the one or more radio-connected electronic devices in a trust certificate format, to one or more requesting users through one or more user interface methods implemented by one or more communication devices of the one or more requesting users.

10. The computer-implemented method of claim 9, further comprising, by the one or more hardware processors:

aggregating at least one of: the one or more first reports, the one or more second reports, and the one or more third reports, along with encumbrance reports, crime reports, network compatibility assessments, diagnostic reports, repair history and parts replacement records, associated with the one or more radio-connected electronic devices;

analyzing, normalizing, and ranking reports about the one or more radio-connected electronic devices to represent the physical, technical, cosmetic and capabilities of the radio-connected electronic device in shared and common terminology accounting for differences in report language among data sources about same device aspect;

exporting the one or more credential-verified trust certificates to an identity of an issuing authority, for validating the one or more credential-verified trust certificates by a recipient system through a cryptographic verification process supporting centralized and decentralized modes of operation; and storing the one or more digital records in the one or more credential-verified trust certificates, wherein the one or more digital records comprise at least one of:

information from one or more verified identity data sources, comprising at least one of: a representation of the information, a report generating party, a unique report identifier, and a cryptographic signature;

one or more authoritative records, from one or more verified identity data sources, summarizing the one or more radio-connected electronic devices through at least one of: the one or more unique identifiers, device manufacturer, brand, product model name, model codes, color, and identification of the device data attributes, associated with the one or more radio-connected electronic devices; and the one or more authoritative records, from the plurality of source provenance certified data sources and verified identity data sources using data models, identifiers, verification structures and digital record and report content, comprising at least one of: an internal synthesized device data repository, an internal source of electronic device DPP, an external source of electronic device DPP, device conformity and certification records, manufacturer-contributed data, mobile network-contributed data, and third party data comprising at least one of: hardware diagnostics report data, erasure report data, crime report data, owner-managed anti-theft locks and encumbrances, mobile network-managed locks and encumbrances, financial encumbrances, repair reports, refurbishment and hardware replacement reports, intervention reports, and destruction reports from one or more processors across one or more lifecycle stages of the one or more radio-connected electronic devices.

11. The computer-implemented method of claim 10, wherein exporting the one or more credential-verified trust certificates to the identity of the issuing authority, comprises:

utilizing a verifiable credential framework from at least one of: traditional public key infrastructure (PKI) using privately signed digital signatures, certificate authorities (CA), X.509 standards, compatible standards, decentralized W3C verifiable credentials (VC), decentralized identifiers (DID), Ethereum smart contracts, Hyperledger smart contracts, permissioned blockchain, blockchain, and smart contract logic; and supporting certificate transparency and security through cryptographically verifiable logs, auditing of the cryptographically verifiable logs, and validating credentials of the one or more users contributing the reports to the one or more credential-verified trust certificates, wherein validating the credentials of the one or more users comprises verifying digital signature of public key of a certificate authority, validating a certificate chain, and determining whether certificates have not expired using online certificate status protocol (OCSP) and certificate revocation lists (CRLs).

12. The computer-implemented method of claim 11, wherein the one or more credential-verified trust certificates are generated in at least one of: a centralized and a decentralized verifiable credential framework and format, and wherein the recipient system is able to validate the one or more credential-verified trust certificates using at least one of:

accessing by the one or more users of the one or more credential-verified trust certificates through a secure data mechanism comprising use of an application programming interface (API) and hypertext transfer protocol (HTTP) request as represented by a certificate code, a secure QR code, a hypertext link, radio frequency identification (RFID) chip, API, one or more machine inter-operable methods to provide access to the one or more credential-verified trust certificates, through a computer-based application, website, utilization of public-facing access method, machine-readable mechanism, and a scannable method;

interacting by a user of the one or more credential-verified trust certificates, to at least one of: request, order, commission, procure generation of the one or more digital records for incorporating the one or more digital records in the one or more credential-verified trust certificates and to request for updating current status of the one or more digital records currently stored in the one or more credential-verified trust certificates;

facilitating the user interaction to request the one or more qualitative and quantitative compatibility scores, for one or more countries and one or more mobile network operators not already contained and refresh existing networks contained in the one or m ore credential-verified trust certificates, as a digital record related to the one or more radio-connected electronic devices;

allowing user access to detailed representations of a verifiable digital record contained in a credential-verified trust certificate about a radio-connected electronic device, where such representations are available and sharing permissions support disclosure to a recipient of the verifiable digital record, wherein the verifiable digital record comprise at least one of: one or more of a device status check, a diagnostics report, an erasure report, and reports of hardware and software systems and sub-systems overall technical capabilities, and an encumbrance report, indicating detailed data points comprising date of a report, the system queried, an intent of the report, specific outcomes and sub-outcomes of the report, accompanying detailed content of the verifiable digital record;

processing the user interaction to request notifications on the one or more credential-verified trust certificates of the one or more radio-connected electronic devices, in which a change to at least one of: physical and software device status points, technical status of a hardware component, an operational encumbrance, is detected to update the one or more credential-verified trust certificates, wherein the notifications utilize one or more formats comprising at least one of: electronic mail (Email), secure Email, certified Email, short message sent (SMS), electronic messaging, and API services, to request that an identity of the recipient is configured to receive a notification of the change and to provide an access method to the change and revised one or more credential-verified trust certificates; and managing recipient interaction to request cessation of notifications on the one or more credential-verified trust certificates by performing at least one of: pause, stop, set to be paused, and set to be stopped, on the changes to one or more device attributes, after a pre-determined period of time.

13. The computer-implemented method of claim 9, wherein determining the profile of the one or more digital records corresponding to each identified radio-connected electronic device, comprises, by the one or more hardware processors:

obtaining the one or more digital records from the plurality of source provenance certified data sources, using data models, identifiers, verification structures and digital record and report content, comprising at least one of: an internal synthesized device data repository, an internal source of electronic device DPP, an external source of electronic device DPP, device conformity and certification records, manufacturer-contributed data, mobile network-contributed data, hardware diagnostics report data, erasure report data, crime report data, owner-managed anti-theft encumbrances, network-managed encumbrances, financial encumbrances, repair reports, refurbishment and hardware replacement reports, intervention reports, and destruction reports, from one or more processors across one or more lifecycle stages of the one or more radio-connected electronic devices;

validating authenticity and credentials of each source provenance certified data source by verifying digital signatures, certificate chains, and determining whether certificates have not expired;

normalizing the one or more digital records received from the plurality of source provenance certified data sources to accommodate variations in data formats, terminology, and structure while maintaining data integrity in describing at least one of: an asp ect, component and capability of the radio-connected electronic device;

mapping the one or more digital records to the corresponding identified radio-connected electronic device using the one or more unique identifiers comprising at least one of: the IMEI, the EID, the serial number;

categorizing the one or more digital records by record type, data source origin, and lifecycle stage to organize information systematically;

associating subsets of the one or more digital records with default trust certificate profiles while maintaining additional digital records available for unabridged certificate inclusion;

aggregating the one or more digital records from the plurality of source provenance certified data sources for each identified radio-connected electronic device to determine device profile;

rectifying conflicts between the one or more digital records from the plurality of source provenance certified data sources by applying a hierarchy and ranking system and methodology based on source authority, data provenance, industry certifications, and recentness; and updating the profile of the one or more radio-connected electronic devices when at least one of: new information becomes available from the plurality of source provenance certified data sources, and existing records are modified.

14. The computer-implemented method of claim 9, wherein generating the one or more credential-verified trust certificates by the one or more hardware processors, comprises:

retrieving a profile of one or more digital records corresponding to each identified radio-connected electronic device from the profile determining subsystem;

analyzing the retrieved profile of one or more digital records corresponding to each identified radio-connected electronic device to identify completeness and quality of data available for trust certificate generation;

selecting corresponding digital records from the retrieved profile corresponding to each identified radio-connected electronic device based on data models, trust certificate requirements, user preferences, and marketplace specifications;

integrating the selected digital records by combining information about device identification and provenance, physical status, technical status, operational status and associated faults, cosmetic condition, hardware repair and refurbishment interventions, destruction status, indication of utilization of non-OEM parts, status of operational encumbrances and locks and asset management and protection services, and device compatibility scoring;

applying cryptographic processes to secure the integrated data, comprising generation of digital signatures and hash values for data integrity verification;

binding the integrated data to identity of the issuing authority using cryptographic methods to establish trust and authenticity;

embedding metadata into the one or more credential-verified trust certificates comprising certificate identifier, issuer information, issuance timestamp, expiration date, and validation mechanisms;

generating centralized format trust certificates compliant with traditional Public Key Infrastructure and decentralized format trust certificates compatible with blockchain and distributed ledger technologies;

storing the generated one or more credential-verified trust certificates in a secure repository with corresponding access controls and audit logging;

creating unique access mechanisms for each trust certificate comprising certificate codes, secure QR codes, hypertext links, RFID chip associations, and API endpoints for certificate retrieval;

establishing validation pathways for recipients to verify authenticity and integrity of the one or more credential-verified trust certificates through cryptographic verification processes; and maintaining version control of the one or more credential-verified trust certificates to track updates and modifications while preserving historical certificate states for audit purposes.

15. The computer-implemented method of claim 9, wherein determining the one or more compatibility scores of the one or more radio-connected electronic devices, by the one or more hardware processors, comprises:

receiving requests for compatibility scoring of the one or more radio-connected electronic devices with an intended operational locality, wherein the requests specify at least one of: a country and a mobile network operator in a country;

obtaining, device technical specifications from the device identifying subsystem, wherein the device technical specifications comprise radio and frequency capabilities, supported network technologies, frequency bands, modem and antenna configurations, in supporting communications using second-generation GSM (2G), third-generation UMTS (3G), fourth-generation LTE (4G), fifth-generation NR (5G) Non-Standalone (NSA), and NR 5G Standalone (SA) network technologies and other emerging technologies;

retrieving network operator specifications for the specified one or more countries and one or more mobile network operators, wherein the network operator specifications comprise frequency bands, network technologies, spectrum assignments, and technical requirements deployed, licensed, and authorized for use for network implementation;

accessing trust certificate user profile information when available, wherein the user profile information comprises default selection data for preferred countries and network operators;

providing interactive mechanisms for one or more users to request additional compatibility assessments for country and mobile network operator combinations not previously evaluated, resulting in incremental updates to device compatibility scoring reports;

processing input from a recognized user for incrementally adding utilization context about the one or more radio-connected electronic devices, wherein the utilization context comprises an intended country and networks in a country for inclusion in a digital report;

performing technical compatibility analysis by comparing the device technical specifications against the network operator specifications to determine radio frequency alignment, network technology compatibility, and spectrum band support;

determining quantitative compatibility scores based on technical alignment metrics, wherein the quantitative compatibility scores represent percentage compatibility;

generating qualitative compatibility assessments based on operational suitability, wherein the qualitative compatibility assessments comprise compatibility ratings;

generating time-stamped device compatibility scoring reports that document compatibility analysis results, methodology used, internal data sources, and validity period of the qualitative compatibility assessments;

storing the device compatibility scoring reports as digital records associated with the corresponding radio-connected electronic device for future reference and trust certificate inclusion; and updating the one or more compatibility scores when the network operator specifications change, new spectrum assignments occur, and device technical specifications are modified.

16. The computer-implemented method of claim 9, further comprising, by the one or more hardware processors, determining erasure status of the one or more radio-connected electronic devices indicating successful completion of erasure through at least one of: an industry-standard device erasure software application, and a system interface to implement device erasure.

17. A non-transitory computer-readable storage medium having instructions stored therein that when executed by one or more hardware processors, cause the one or more hardware processors to execute operations of:

identifying one or more radio-connected electronic devices through one or more unique identifiers available for the one or more radio-connected electronic devices, wherein the one or more unique identifiers are standards-based device identifiers comprising at least one of: International Mobile Equipment Identity (IMEI), Embedded Identity Document (EID), and serial number, and wherein the one or more unique identifiers indicate device data attributes comprising at least one of: visible attributes comprising make, model information, cosmetic, functional and technical conditions, non-visible attributes, and non-disclosed attributes comprising modem radio configuration and capabilities;

determining a profile of one or more radio-connected electronic devices from one or more first reports, one or more second reports, and one or more third reports from a plurality of source provenance certified data sources using data models and data model frameworks to generate a digital twin representation of each identified radio-connected electronic device of the one or more radio-connected electronic devices;

generating one or more credential-verified trust certificates by integrating data associated with the digital records and profiles corresponding to each identified radio-connected electronic device in the data model frameworks to support transparency and traceability of data reports about each radio-connected electronic device;

determining, for the one or more radio-connected electronic devices, the one or more first reports applicable to an associated profile of a radio-connected electronic device regarding the ability of the radio-connected electronic device to be identified, differentiated from another radio-connected electronic device, transacted, associated with a new user account, authenticated by an Original Equipment Manufacturer (OEM) for at least one of: Digital Product Passports (DPPs), warranty and registration, and connected to a cellular network as intended;

determining, for the one or more radio-connected electronic devices, the one or more second reports applicable to the associated profile of the radio-connected electronic device regarding one or more reports about functional, technical, operational, physical, and cosmetic status, and condition, status, and capabilities of the radio-connected electronic device in terms of the ability to safely and effectively use the radio-connected electronic device as intended by a new user;

determining, for the one or more radio-connected electronic devices, the one or more third reports applicable to certified end-of-life processing, comprising secure erasure, physical destruction, and material recovery of the one or more radio-connected electronic devices;

determining owner-imposed anti-theft locks and encumbrances to prevent unauthorized transaction and re-use of the radio-connected electronic device by another end-user as the one or more first reports based on at least one of: a device manufacturer, an owner, and asset management user of the one or more radio-connected electronic devices, impacting the ability to be acquired by and subsequently utilized by a new owner without a reduction in operational capabilities;

determining network-imposed device locks and encumbrances indicating that the radio-connected electronic device is locked due to at least one of: claim of contract disputes, purchase obligations, unpaid service fees, and unsatisfied obligation in which prior owner's mobile network has locked the radio-connected electronic device to or from a network associated with the radio-connected electronic device;

determining one or more compatibility scores of the one or more radio-connected electronic devices with an intended operational locality through use of a device compatibility service for at least one of: a country and a mobile network operator in a country, wherein the one or more compatibility scores are determined through input from at least one of a user profile and a recognized user for compatibility scoring of the one or more radio-connected electronic devices for at least one of: a country and a network not already contained in a compatibility scoring report for the radio-connected electronic device;

accessing, analyzing, and associating the one or more first reports, the one or more second reports, and the one or more third reports to the one or more radio-connected electronic devices, indicating the ability of the one or more radio-connected electronic devices to be identified, differentiated, transacted, and operated as intended by the new user;

determining one or more certifications and credentials of the plurality of source provenance certified data sources and verified identity data sources, that providing the one or more first reports applicable to device identification and entitlement, the one or more second reports applicable to the functional, technical, and cosmetic status and condition, and the one or more third reports applicable to certified device destruction through a certified device destruction facility, with regard to the one or more radio-connected electronic devices; and providing and transmitting the determined one or more first reports, one or more second reports, and the one or more third reports of the one or more radio-connected electronic devices in a trust certificate format, to one or more requesting users through one or more user interface methods implemented by one or more communication devices of the one or more requesting users.

* * * * *